United States Patent
Takihara et al.

(10) Patent No.: US 9,519,082 B2
(45) Date of Patent: Dec. 13, 2016

(54) MICROSCOPIC ROUGHNESS STRUCTURE WITH PROTECTIVE FILM AND METHOD THEREOF

(75) Inventors: Tsuyoshi Takihara, Otake (JP); Seiichiro Mori, Otake (JP); Eiko Okamoto, Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 85 days.

(21) Appl. No.: 14/238,053

(22) PCT Filed: Aug. 16, 2012

(86) PCT No.: PCT/JP2012/070805
§ 371 (c)(1),
(2), (4) Date: Feb. 10, 2014

(87) PCT Pub. No.: WO2013/024887
PCT Pub. Date: Feb. 21, 2013

(65) Prior Publication Data
US 2014/0205805 A1    Jul. 24, 2014

(30) Foreign Application Priority Data

Aug. 16, 2011 (JP) ................... 2011-177818
Nov. 25, 2011 (JP) ................... 2011-257915

(51) Int. Cl.
*G02B 1/10* (2015.01)
*C09J 5/06* (2006.01)
*G02B 1/118* (2015.01)

(52) U.S. Cl.
CPC ............ *G02B 1/105* (2013.01); *C09J 5/06* (2013.01); *G02B 1/118* (2013.01); *Y10T 156/10* (2015.01); *Y10T 428/24364* (2015.01)

(58) Field of Classification Search
CPC ........... G02B 1/105; G02B 1/118; C09J 7/00; C09J 5/06; Y10T 428/24364
(Continued)

(56) References Cited

U.S. PATENT DOCUMENTS

2004/0067339 A1* 4/2004 Gandon et al. ............ 428/141
2010/0092693 A1* 4/2010 Park et al. .................. 427/535
(Continued)

FOREIGN PATENT DOCUMENTS

EP    2 128 659 A1    12/2009
EP    2 447 740 A1    5/2012
(Continued)

OTHER PUBLICATIONS

Extended European Search Report dated May 9, 2014 (6 pages).
International Search Report dated Nov. 20, 2012 for International application No. PCT/JP2012/070805.

*Primary Examiner* — Nancy Johnson
(74) *Attorney, Agent, or Firm* — Morgan, Lewis & Bockius LLP

(57) ABSTRACT

In a protective film affixed to a microscopic roughness structure having a microscopically rough structure on the surface, water contact angle of the surface of the microscopic roughness structure is 40° or less, compressive stress obtainable when the adhesive layer of the protective film is compressed to a compression ratio of 20% is 0.6 MPa to 3.0 MPa; in the infrared absorption spectrum of the surface on the microscopically rough structure side of the microscopic roughness structure, ratio (A1/A2) of peak area A1 having absorption maximum of 3700 $cm^{-1}$ to 3100 $cm^{-1}$, and peak area A2 having absorption maximum of 1730±10 $cm^{-1}$, is 0.1 to 0.8; in the surface of adhesive layer of the protective film, ratio (B1/B2) of peak area B1 having absorption maximum of 3700 $cm^{-1}$ to 3100 $cm^{-1}$, and peak area B2 having absorption maximum of 1730±10 $cm^{-1}$, is 0.6 to 1.3.

13 Claims, 5 Drawing Sheets

(58) Field of Classification Search
USPC .............................. 428/40.1, 41.5, 42.3, 142
See application file for complete search history.

(56) References Cited

U.S. PATENT DOCUMENTS

2010/0284087 A1* 11/2010 Yamada et al. ............... 359/580
2012/0008213 A1    1/2012 Tsuda et al.

FOREIGN PATENT DOCUMENTS

| JP | 2000-135755 A | 5/2000 |
|---|---|---|
| JP | 2005-298630 A | 10/2005 |
| JP | 2008-214437 A | 9/2008 |
| JP | 2009-210749 A | 9/2009 |
| JP | 2009-258168 A | 11/2009 |
| JP | 2009-269237 A | 11/2009 |
| JP | 2010-120348 A | 6/2010 |
| JP | 2011-013496 A | 1/2011 |
| JP | 2011-032331 A | 2/2011 |
| JP | 2011-088356 A | 5/2011 |
| WO | 2008/096872 A1 | 8/2008 |
| WO | WO 2009/074146 A2 | 6/2009 |
| WO | 2009/110139 A1 | 9/2009 |
| WO | WO 2010/113868 A1 | 10/2010 |
| WO | WO 2010/150514 A1 | 12/2010 |

* cited by examiner

MICROSCOPIC ROUGHNESS STRUCTURE WITH PROTECTIVE FILM AND METHOD THEREOF

TECHNICAL FIELD

The present invention relates to a protective film-attached microscopic roughness structure, and a method for producing the same.

The present application claims priority based on Japanese Patent Application No. 2011-177818 filed in Japan on Aug. 16, 2011, and Japanese Patent Application No. 2011-257915 filed in Japan on Nov. 25, 2011, the disclosures of which are incorporated herein by reference.

BACKGROUND ART

A microscopic roughness structure having a microscopically rough structure on the surface in which fine concavities and convexities is regularly disposed, is known to exhibit antireflective performance by continuously changing the refractive index. In order for the microscopic roughness structure to exhibit satisfactory antireflective performance, it is required that the interval (period) between adjoining convexities or adjoining concavities be less than or equal to the wavelength of visible light. Such a microscopic roughness structure is also capable of exhibiting super water-repellent performance by means of the lotus effect.

Regarding the method for forming a microscopically rough structure, for example, those methods described below have been suggested.

Method of performing injection molding or press molding using a mold in which a microscopically rough structure is formed on the surface (Method 1).

Method of disposing an active energy ray-curable resin composition (hereinafter, described as a resin composition) between a mold and a transparent base material, curing the resin composition by irradiation of active energy radiation, thereby transferring the microscopically rough structure of the mold onto the cured product, and then detaching the mold from the cured product (Method 2).

Method of transferring the microscopically rough structure of a mold to a resin composition, subsequently detaching the mold from the resin composition, and curing the resin composition by irradiation of active energy radiation (Method 3).

Among these, when the transferability of the microscopically rough structure and the degree of freedom of the surface composition are considered, methods of curing a resin composition by irradiation of active energy radiation, and transferring the microscopically rough structure of a mold (Methods 2 and 3) are suitable. These methods are methods that are particularly suitable in the case of using a belt-shaped mold or a roll-shaped mold, both which are capable of continuous production, and have excellent productivity.

However, a microscopic roughness structure has problems such as described below.

The microscopic roughness structure may have inferior scratch resistance compared with a molded product produced using the same resin composition and having a smooth surface.

When a film-like microscopic roughness structure having the microscopically rough structure of a mold transferred thereon is continuously produced, and this is wound into a roll form, if the hardness of the cured product is not sufficient, the shape of the microscopically rough structure (particularly the shape of convexities) may be changed by tight winding.

When a film-like microscopic roughness structure having the microscopically rough structure of a mold transferred thereon is attached to various displays and the like, the shape of the microscopic roughness structure (particularly the shape of convexities) may be changed by the load.

Thus, for the purpose of maintaining (protecting) the shape of the microscopic roughness structure, there are occasions in which a protective film is affixed to the surface on the microscopically rough structure side until the microscopic roughness structure is used.

However, when the period of the microscopically rough structure is several nanometers (nm) to several hundred nanometers (nm), since the interval between convexities is narrower compared to conventional microscopically rough structures, the contact area between the microscopic roughness structure and the protective film is small.

Furthermore, it is difficult for the adhesive component of the adhesive layer of the protective film to penetrate into the concavities of the microscopically rough structure. Therefore, there are occasions in which the protective film does not sufficiently adhere to the microscopic roughness structure, and at the time of storage or transport, the protective film may be detached.

Regarding a protective film for an optical film having a microscopically rough structure on the surface, products described below have been disclosed.

(1) A protective film having an adhesive layer, for which when the adhesive layer is attached on a prism sheet, and then the prism sheet is pressed under particular conditions, the degree of penetration relative to the thickness of the adhesive layer of the prism sheet is 45% or less (Patent Document 1).

(2) A protective film having an adhesive layer having a surface roughness of 0.030 µm or less (Patent Document 2).

As such, a protective film is required to have close adhesiveness, and on the other hand, when a protective film including an adhesive layer containing an adhesive with stronger adhesive force than the conventional cases (strong adhesive protective film) is used, there is a problem that surface contamination of the microscopic roughness structure due to the adhesive occurs. This is speculated to be caused by the adhesive component of the adhesive layer penetrating deeply into the concavities of the microscopically rough structure as time passes, or by the adhesive component remaining on the surface of the microscopic roughness structure when the protective film is detached (hereinafter, these will be described as adhesive residue). Surface contamination of the microscopic roughness structure is led to a decrease in the antireflective performance. Specifically, the wavelength-dependency of reflectance may change, or the reflectance may generally increase.

Thus, regarding a protective film which can be easily affixed to a microscopic roughness structure and in which the adhesive component cannot easily penetrate deeply into the concavities of the microscopically rough structure, products such as described below have been disclosed.

(3) A protective film having an adhesive layer laminated on the surface of a base material film such that the protective film would be affixed to areas other than the microscopically rough structure of the microscopic roughness structure (Patent Document 3).

However, the protective films of items (1) to (3) do not necessarily sufficiently satisfy adhesiveness and the suppression of adhesive residue.

CITATION LIST

Patent Document 1: Japanese Patent Application Laid-Open (JP-A) No. 2011-13496
Patent Document 2: JP-A No. 2011-88356
Patent Document 3: JP-A No. 2010-120348

DISCLOSURE OF INVENTION

Problem to be Solved by the Invention

The present invention was achieved in view of such circumstances, and it is an object of the invention to provide a protective film-attached microscopic roughness structure in which a microscopic roughness structure having a microscopically rough structure on the surface satisfactorily adheres to a protective film and does not peel off carelessly, and adhesive residue does not easily occur after the protective film is peeled off; and a method for producing the microscopic roughness structure.

Means for Solving Problem

The inventors of the present invention conducted a thorough investigation, and as a result, they found that surface contamination (adhesive residue) of a microscopic roughness structure caused by an adhesive component can be solved by promoting a balance between the force that works between the surface of the microscopically rough structure and the adhesive layer, and the force by which the adhesive layer itself is pulled when the protective film is peeled off.

In regard to the protective film of item (2), as the adhesive layer is designed to have a low glass transition temperature, the microscopically rough structure exhibits adhesiveness by encroaching on the adhesive layer and gaining more contact area. For the conventional protective films, how much the contact area can be enlarged has been an important matter.

However, it is now possible to allow a protective film to have sufficient adhesiveness by strengthening the interaction between the adhesive layer and the microscopically rough structure at the contact site, without increasing the contact area.

If the strength (cohesive force) of the adhesive layer is weak, breakage occurs with a force weaker than the force required to tear off the adhesive layer from the surface of the microscopically rough structure, and the adhesive layer tends to cause cohesive failure.

Therefore, the present invention was finally completed based on the conception that if the adhesive layer has a strength capable of sufficiently withstanding the force required to tear off the adhesive layer from the surface of the microscopically rough structure, adhesive residue does not easily occur.

That is, the present invention includes the following embodiments.

(1) A protective film-attached microscopic roughness structure in which a microscopic roughness structure on the surface having a microscopically rough structure with a period less than or equal to the wavelength of visible light, is affixed with a protective film for protecting the surface of the microscopic roughness structure, wherein the water contact angle of the surface of the microscopic roughness structure is 40° or less, the protective film has an adhesive layer that is in contact with the surface on the microscopically rough structure side, and the compressive stress obtainable when the adhesive layer is compressed in the thickness direction to a compression ratio of 20% is 0.6 MPa to 3.0 MPa.

(2) A protective film-attached microscopic roughness structure in which a microscopic roughness structure on the surface having a microscopically rough structure with a period less than or equal to the wavelength of visible light, is affixed with a protective film for protecting the surface of the microscopic roughness structure, wherein the protective film has an adhesive layer that is in contact with the surface on the microscopically rough structure side; the ratio (A1/A2) of the peak area A1 having the absorption maximum in the region of 3700 $cm^{-1}$ to 3100 $cm^{-1}$ in the infrared absorption spectrum of the surface of the microscopically rough structure, and the peak area A2 having the absorption maximum in the region of 1730±10 $cm^{-1}$ is 0.1 to 0.8; and the ratio (B1/B2) of the peak area B1 having the absorption maximum in the region of 3700 $cm^{-1}$ to 3100 $cm^{-1}$ in the infrared absorption spectrum of the surface of the adhesive layer, and the peak area B2 having the absorption maximum in the region of 1730±10 cm-1 is 0.6 to 1.3.

(3) The protective film-attached microscopic roughness structure described in the item (1), wherein the ratio (B1/B2) of the peak area B1 having the maximum absorption in the region of 3700 $cm^{-1}$ to 3100 $cm^{-1}$ in the infrared absorption spectrum of the surface of the adhesive layer, and the peak area B2 having the absorption maximum in the region of 1730±10 $cm^{-1}$ is 0.6 to 1.3.

(4) The protective film-attached microscopic roughness structure described in the above item (1), wherein the ratio (A1/A2) of the peak area A1 having the absorption maximum in the region of 3700 $cm^{-1}$ to 3100 $cm^{-1}$ in the infrared absorption spectrum of the surface of the microscopically rough structure, and the peak area A2 having the absorption maximum in the region of 1730±10 $cm^{-1}$ is 0.1 to 0.8.

(5) The protective film-attached microscopic roughness structure described in the above item (1), wherein the storage elastic modulus E' of the adhesive layer is in the range of $1\times10^6$ Pa to $6\times10^6$ Pa at at least any one temperature in the range of 10° C. to 60° C.

(6) The protective film-attached microscopic roughness structure described in the above item (2) or (5), wherein the adhesive layer has a rubbery plateau region in the range of the storage elastic modulus E' of $1.5\times10^6$ Pa or greater.

(7) A method for producing the protective film-attached microscopic roughness structure described in the above item (1) or (2), the method including heating the adhesive layer, and affixing the protective film to the surface of the microscopic roughness structure.

(8) The method for producing the protective film-attached microscopic roughness structure described in the above item (7), wherein the protective film is affixed to the surface of the microscopic roughness structure while having the storage elastic modulus E' of the adhesive layer adjusted to $6\times10^6$ Pa or less.

Effect of the Invention

The protective film-attached microscopic roughness structure of the present invention is such that the microscopic roughness structure having a microscopically rough structure at the surface satisfactorily adheres to the protective film and does not peel off carelessly, and adhesive residue does not easily occur after the protective film is peeled off.

According to the method for producing the protective film-attached microscopic roughness structure of the present invention, a protective film-attached microscopic roughness structure in which the microscopic roughness structure having a microscopically rough structure at the surface satisfactorily adheres to the protective film and does not peel off carelessly, and adhesive residue does not easily occur after the protective film is peeled off, can be produced.

BEST MODE(S) FOR CARRYING OUT THE INVENTION

The term "(meth)acrylate" means acrylate or methacrylate, and the term "(meth)acryloyl group" means an acryloyl group or a methacryloyl group.

Furthermore, the "active energy radiation" according to the present specification means visible light, ultraviolet radiation, electron beams, plasma, thermal radiation (infrared radiation or the like), or the like.

Furthermore, the "wavelength of visible light" according to the present specification means a wavelength of 380 nm to 780 nm.

In FIG. 1, FIG. 2, FIG. 3 and FIG. 6, in order to adjust the various layers to recognizable sizes in the diagrams, the scales are varied for the respective layers.

Figure 1:
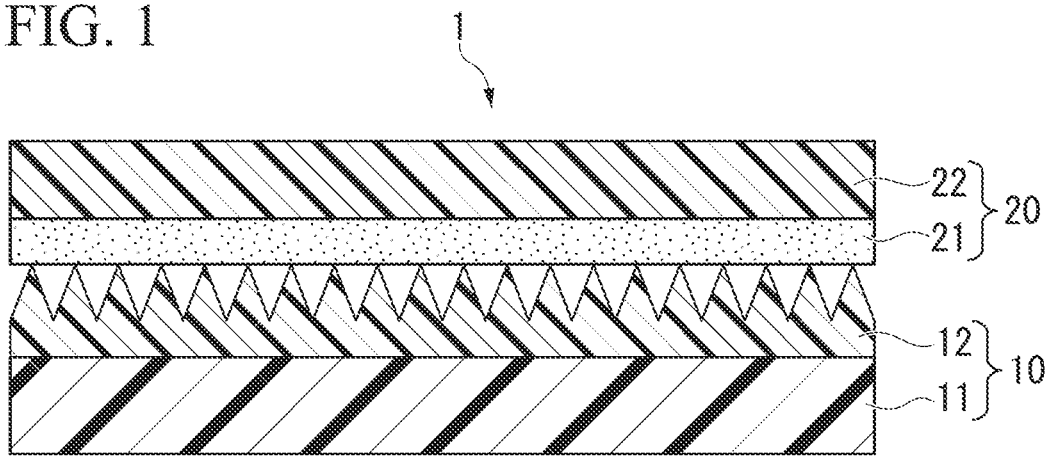
FIG. 1 is a cross-sectional diagram illustrating an example of the protective film-attached microscopic roughness structure.
Figure 2:
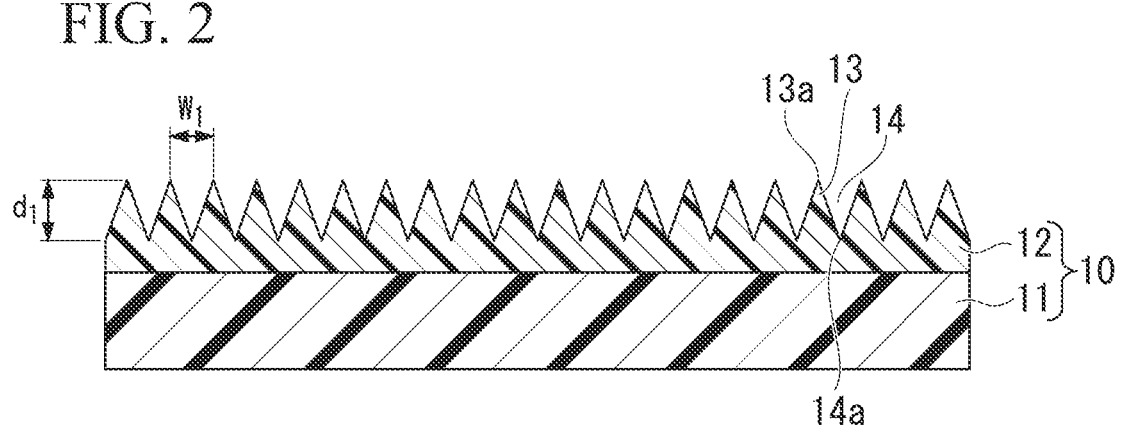
FIG. 2 is a cross-sectional diagram illustrating an example of the microscopic roughness structure.
Figure 3:
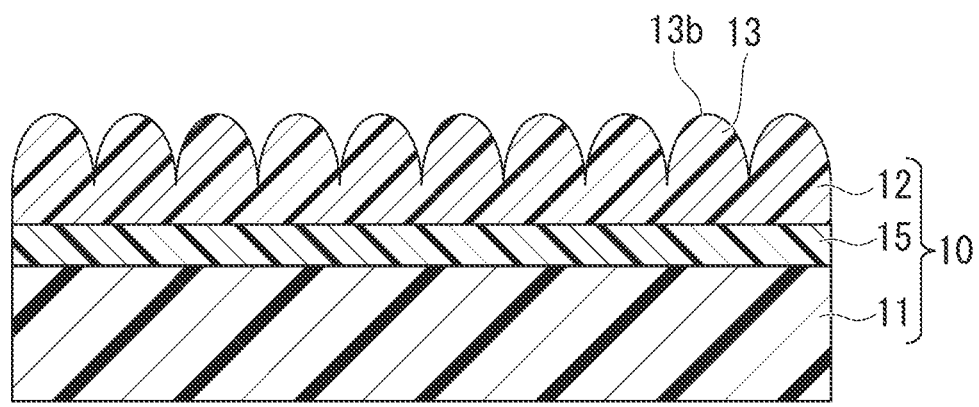
FIG. 3 is a cross-sectional diagram illustrating another example of the microscopic roughness structure.

Also, in FIG. 2 and FIG. 3, the same reference symbols are assigned to the same constituent elements as those shown in FIG. 1, and further descriptions thereof may not be repeated.

Protective Film-Attached Microscopic Roughness Structure

First Exemplary Embodiment

The protective film-attached microscopic roughness structure related to the first exemplary embodiment of the present invention includes, for example, as illustrated in FIG. 1, a microscopic roughness structure 10 and a protective film 20.

The protective film-attached microscopic roughness structure 1 is such that the protective film 20 is affixed to the microscopic roughness structure 10 such that the surface on the microscopically rough structure side of the microscopic roughness structure 10 and the adhesive layer 21 of the protective film 20 are to be in contact.

When the microscopic roughness structure 10 is in a film form or a sheet form, the protective film-attached microscopic roughness structure 1 may have a shape such as a laminate film having a predetermined size, or may be in a roll form.

(Microscopic Roughness Structure)

The microscopic roughness structure 10 of the present exemplary embodiment includes, as illustrated in FIG. 2, a base material 11, and a cured product 12 having a microscopically rough structure on the surface, which is formed on the surface of the base material 11.

Meanwhile, the surface on the side where the microscopically rough structure is formed (microscopically rough structure side) may be referred to as the "front surface of the microscopic roughness structure". Furthermore, when the microscopic roughness structure is in a film form or a sheet form, the surface on the side opposite to the microscopically rough structure side may be referred to as the "back surface of the microscopic roughness structure".

Base Material:

Regarding the base material 11 of the present exemplary embodiment, any base material capable of supporting the cured product 12 having a microscopically rough structure on the surface may be used, and in the case of applying the microscopic roughness structure 10 to a display member or the like, a transparent base material, that is, a base material capable of transmitting light, is preferred.

Examples of the material for the transparent base material include synthetic polymers (a methyl methacrylate (co) polymer, polycarbonate, a styrene (co)polymer, a methyl methacrylate-styrene copolymer, and the like), semi-synthetic polymers (cellulose diacetate, cellulose triacetate, cellulose acetate butyrate, and the like), polyesters (polyethylene terephthalate, polylactic acid, and the like), polyamides, polyimides, polyether sulfones, polysulfones, polyethylene, polypropylene, polymethylpentene, polyvinyl chloride, polyvinyl acetal, polyether ketone, polyurethane, composites thereof (a composite of polymethyl methacrylate and polylactic, a composite of polymethyl methacrylate and polyvinyl chloride, and the like), and glass.

The shape of the base material 11 can be appropriately selected according to the use of the microscopic roughness structure 10, and when the microscopic roughness structure 10 is an antireflective film or the like, a sheet form or a film form is preferred.

Examples of the method for producing the base material 11 include an injection molding method, an extrusion molding method, and a cast molding method.

The surface of the base material 11 may be subjected to coating or a corona treatment, for the purpose of improving characteristics such as close adhesiveness, antistatic properties, scratch resistance, and weather resistance.

Cured Product:

The cured product 12 of the present exemplary embodiment is formed from a cured product of an active energy ray-curable resin composition (hereinafter, described as a resin composition), and has a microscopically rough structure on the surface.

The microscopically rough structure is formed from conically shaped convexities 13 and concavities 14 that are aligned at an equal interval.

The period of the microscopically rough structure, that is, the distance $W_1$ from the apex 13a of a convexity 13 to the apex 13a of a convexity 13 adjacent thereto, is less than or equal to the wavelength of visible light.

When the period of the microscopically rough structure is less than or equal to the wavelength of visible light, that is, 380 nm or less, scattering of visible light can be suppressed, and the microscopic roughness structure can be suitably used for optical applications such as an antireflective film.

The period of the microscopically rough structure is preferably 25 nm or greater from the viewpoint that the convexities 13 can be more easily formed.

The period of the microscopically rough structure is determined by measuring the distance $W_1$ between adjacent convexities 13 at 10 sites using a field emission type scanning electron microscope, and averaging these values.

It is preferable that the height of a convexity 13 (or the depth of a concavity 14), that is, the vertical distance d1 from the apex 13a of a convexity 13 to the bottom 14a of a concavity 14, be a depth capable of suppressing the variation in the reflectance caused by wavelength. Specifically, the height is preferably 60 nm or greater, more preferably 90 nm or greater, even more preferably 150 nm or greater, and particularly preferably 180 nm or greater. When the height of the convexity 13 is close to 150 nm, the reflectance of the light in the wavelength region of 550 nm, which is considered to be easily recognizable by a human being, can be made the lowest. Particularly, when the height of the convexity 13 is 150 nm or greater, as the height of the convexity 13 increases, the difference between the maximum reflectance and the minimum reflectance in the visible light region is decreased. Therefore, when the height of the convexity 13 is 150 nm or greater, the wavelength dependency of the reflected light is decreased, and the difference in the color tone is not visually recognizable.

The height of the convexity 13 is preferably 400 nm or less, from the viewpoint that the scratch resistance of the convexity 13 becomes satisfactory.

The height of the convexity 13 is determined by measuring the heights (vertical distances $d_1$) of ten convexities 13 using a field emission type scanning electron microscope, and averaging these values.

The shape of the convexity 13 is preferably a shape in which the cross-sectional area of a perpendicular surface continuously increases from the apex 13a side toward the base material 11 side, because the refractive index can be continuously increased, variation of the reflectance caused by wavelength (wavelength-dependency) is suppressed, and scattering of visible light can be suppressed to thereby obtain a low reflectance.

Water Contact Angle of Cured Product:

However, as described above, when the period of the microscopically rough structure is several nanometers (nm) to several hundred nanometers (nm), since the interval between the convexities 13 is narrow, the contact area between the microscopic roughness structure 10 and the protective film 20 is small, and it is difficult for the protective film 20 to sufficiently closely adhere to the microscopic roughness structure 10.

Thus, the inventors of the present invention conducted a thorough investigation, and as a result, they found that the decrease in adhesiveness that is caused by the period of the microscopically rough structure can be improved by the properties of the cured product 12. In the case of forming the cured product 12 using a resin composition, the adhesiveness changes due to the surface free energy. For example, it has already been known that when the surface is treated by fluorine coating, contaminants cannot easily adhere thereto, or when the surface is treated with silicone, the friction of the surface is decreased. As such, when a material having low polarity is used, the surface free energy is decreased, and adhesiveness tends to decrease. On the contrary, when a material having high polarity is used, the surface free energy is increased, and adhesiveness tends to increase.

The inventors of the present invention paid attention to the water contact angle as an index of the surface free energy.

Regarding the water contact angle, when a water droplet is dropped on a surface which can be considered macroscopically as a smooth surface, the water contact angle refers to the angle of a tangent line of the water droplet at a point where the three phases of the smooth surface, the water droplet and air meet. Generally, it is believed that when the water contact angle is 90° or less, a hydrophilic surface is formed, and when the water contact angle is greater than 90°, a water-repellent surface is formed. As the water contact angle is decreased, the surface exhibits higher surface free energy.

When the surface has a microscopically rough structure having a period less than or equal to the wavelength of visible light as described above, if the constituent material of the microscopically rough structure (resin composition) is hydrophilic, the water contact angle at the surface becomes small, and a hydrophilic surface is obtained. On the other hand, if the constituent material of the microscopically rough structure is hydrophobic, the water contact angle at the surface becomes large, and a hydrophobic surface is obtained.

In the present exemplary embodiment, the water contact angle of the surface of the microscopic roughness structure 10 is 40° or less, preferably 5° to 30°, and more preferably 10° to 20°. When the water contact angle is 40° or less, the surface free energy is increased, and the protective film 20 satisfactorily adheres to the microscopic roughness structure 10.

In order to adjust the water contact angle of the surface of the microscopic roughness structure 10 to 40° or less, it is convenient to incorporate a hydrophilic polymerizable component to the material of the cured product 12 (resin composition). For example, when a polymerizable component having a polyethylene glycol structure or the like is used, the water contact angle of the surface of the microscopic roughness structure 10 can be made to 40° or less. Examples of the polymerizable component having a polyethylene glycol structure include polyethylene glycol diacrylate and polyethylene glycol monoacrylate.

Fingerprint Removability of Microscopic Roughness Structure:

However, when the microscopic roughness structure 10 is used as an antireflective film or the like, the microscopic roughness structure is usually used in a state of being affixed to the surface of an object such as a display. Therefore, because there are many chances that the microscopic roughness structure may be touched by people's hands, the microscopic roughness structure 10 preferably have fingerprint removability, by which any fingerprint contamination attached thereto upon use can be removed. Specifically, it is preferable that fingerprint contamination can be removed by wiping with a damp cloth, as described in WO 2008/096872.

Determination of whether fingerprint contamination can be removed by wiping with a damp cloth is carried out by, for example, a method such as described below.

The surface of a microscopic roughness structure 10 on the side opposite to the microscopically rough structure side is painted black using a lacquer spray or the like, and the fingerprint of one index finger is attached on the surface of the microscopically rough structure side of the microscopic roughness structure 10. Subsequently, within 5 minutes thereafter, the microscopic roughness structure 10 is immersed in a water bath containing tap water for 3 seconds to thereby allow the structure to be soaked with tap water. Subsequently, the surface of the microscopic roughness structure 10 having the fingerprint attached thereon is wiped once using a cleaning cloth that has been squeezed to the extent that water droplets would not drip therefrom, under a load of 10 g per one square centimeter, and then the external appearance of the surface is visually evaluated. The evaluation is carried out by inclining the microscopic roughness structure under a fluorescent lamp (1000 Lux) in an environment at room temperature of 23° C. and a relative humidity of 65%. When contamination is visually unrecognizable, it is considered fingerprint contamination is removable by wiping with a damp cloth.

When the water contact angle of the surface of the microscopic roughness structure 10 is 40° or less, as described above, the protective film 20 adheres satisfactorily to the microscopic roughness structure 10. Also, since the surface on the microscopically rough structure side of the microscopic roughness structure 10 becomes hydrophilic, water spreads wetting between the contamination attached to the surface of the microscopic roughness structure 10 and the surface of the microscopic roughness structure 10, and lifts the contamination, and thereby the removal of the contamination is enabled. Therefore, fingerprint contamination can be easily removed by wiping with a damp cloth.

Infrared Absorption Spectrum of Cured Product:

In the infrared absorption spectrum of the surface of the microscopically rough structure of the microscopic roughness structure 10, that is, the surface of the cured product 12, the ratio (A1/A2) between the peak area A1 having the absorption maximum in the region of 3700 $cm^{-1}$ to 3100 $cm^{-1}$ and the peak area A2 having the absorption maximum in the region of 1730±10 $cm^{-1}$ is preferably 0.1 to 0.8, more preferably 0.2 to 0.7, and even more preferably 0.3 to 0.6.

When the ratio A1/A2 is 0.1 or greater, the protective film 20 adheres more satisfactorily to the microscopic roughness structure 10. When the ratio A1/A2 is 0.8 or less, the phenomenon in which the microscopic roughness structure 10 absorbs water, and thereby the convexities 13 draw closer to each other due to surface tension, can be avoided.

Furthermore, when the ratio A1/A2 is 0.1 to 0.8, as described above, the protective film 20 adheres more satisfactorily to the microscopic roughness structure 10. Also, since the surface on the microscopically rough structure side of the microscopic roughness structure 10 becomes hydrophilic, water spreads wetting between the contamination attached to the surface of the microscopic roughness structure 10 and the surface of the microscopic roughness structure 10, and lifts the contamination, and thereby the removal of the contamination is enabled. Therefore, fingerprint contamination can be easily removed by wiping with a damp cloth.

Meanwhile, the relationship between the ratio A1/A2 and the adhesiveness of the adhesive layer 21 to the microscopic roughness structure 10, the method for measuring the infrared absorption spectrum, and the like will be described in detail in the second exemplary embodiment that will be described below.

Use of Microscopic Roughness Structure:

Since the microscopic roughness structure 10 of the present exemplary embodiment has, on the surface, a microscopically rough structure having a period less than or equal to the wavelength of visible light, the microscopic roughness structure 10 is suitable for optical applications, particularly as antireflective articles such as an antireflective film and a three-dimensionally shaped antireflective body.

Other Forms of Microscopic Roughness Structure:

The microscopic roughness structure 10 of the present exemplary embodiment is not limited to that illustrated in FIG. 2.

For example, the cured product 12 having a microscopically rough structure may be formed on one surface of the base material 11, or may be formed on both surfaces.

Furthermore, the microscopically rough structure may be formed on the entire surface of the cured product 12, or may be formed on a portion of the surface.

Furthermore, the shape of the convexity 13 is not limited to a conical shape or a pyramidal shape such as shown in FIG. 2, and the shape may be bell-shaped, with the apex 13b of the convexity 13 being a curved surface as shown in FIG. 3. In addition to that, a shape in which the cross-sectional area of the perpendicular plane continuously increases from the apex side toward the base material side, can be employed.

Meanwhile, in order to cause the microscopic roughness structure 10 to exhibit water repellent performance effectively, it is preferable that the apex of the convexity 13 be finer, and it is preferable that the area occupied by the cured product 12 at the contact surface between the microscopic roughness structure 10 and a water droplet be as small as possible.

Intermediate Layer:

Furthermore, as illustrated in FIG. 3, an intermediate layer 15 may be provided between the base material 11 and the cured product 12, for the purpose of enhancing various properties such as scratch resistance and adhesiveness.

Examples of the material of the intermediate layer 15 include an acrylic resin, polyester, polyurethane, acryl-graft polyester, polyethyleneimine, polycarbonate, polybutadiene, and a styrene-based resin.

(Protective Film)

The protective film 20 of the present exemplary embodiment is to protect the surface of the microscopic roughness structure 10, and as illustrated in FIG. 1, the protective film is attached to the surface on the microscopically rough structure side of the microscopic roughness structure 10.

The protective film 20 includes a film base material 22 and an adhesive layer 21 formed on the surface of the film base material 22.

Adhesive Layer:

The adhesive layer 21 of the present exemplary embodiment is in contact with the surface on the microscopically rough structure side of the microscopic roughness structure 10.

The thickness of the adhesive layer 21 is preferably 3 μm to 200 μm, more preferably 3 μm to 100 μm, and even more preferably 3 μm to 50 μm.

Compressive Stress of Adhesive Layer:

However, as described above, when the protective film 20 is affixed to the surface on the microscopically rough structure side of the microscopic roughness structure 10, the adhesive component in the adhesive layer 21 may penetrate deeply into the concavities 14 of the microscopically rough structure, and when the protective film 20 is detached, a portion of the adhesive layer 21 or the adhesive component may remain on the surface of the microscopic roughness structure 10. In order to suppress adhesive residue, the content of low molecular weight components among the adhesive components may be made relatively smaller, but this is not necessarily a sufficient measure.

When the protective film 20 is affixed to the surface of the microscopic roughness structure 10 having a microscopically rough structure of a submicron order, if the strength of the adhesive layer 21 is too strong (too hard), a contact area between the protective film 20 and the surface of the microscopic roughness structure 10 cannot be secured. Also, since it is difficult for the adhesive component in the adhesive layer 21 to penetrate into the concavities 14, there is a problem that the adhesiveness of the protective film 20 to the microscopic roughness structure 10 is deteriorated. On the other hand, if the strength of the adhesive layer 21 is too weak (too soft), there is a problem that the adhesive component of the adhesive layer 21 penetrates too deeply into the concavities 14 of the microscopically rough structure, and it becomes difficult for the protective film 20 to be detached from the microscopic roughness structure 10. Furthermore, there is also a problem that at the time of detachment of the protective film 20, the adhesive layer 21 undergoes cohesive failure, adhesive residue is generated, and the surface of the microscopic roughness structure 10 is contaminated.

In order to enhance the adhesiveness of the protective film 20, a polymer having a low glass transition temperature or the like may be used as the adhesive component. However, when a polymer having a low glass transition temperature is used, the adhesive layer 21 thus formed tends to be softened, and is prone to cause cohesive failure at the time of detachment of the protective film 20.

As such, it has been difficult to achieve a balance between the ease of adhesion of the protective film 20 to the surface on the microscopically rough structure side of the microscopic roughness structure 10 (adhesiveness) and the difficulty of the occurrence of adhesive residue on the surface on the microscopically rough structure side of the microscopic roughness structure 10 (low contaminability).

Thus, the inventors of the present invention conducted a thorough investigation, and as a result, the inventors found that in order to solve the problem of adhesive residue while acquiring excellent adhesiveness, a cohesive force that would sufficiently surpass the adhesive force between the surface of the microscopic roughness structure 10 and the adhesive layer 21 is required in the adhesive layer 21. The reason for this is as follows.

For example, when the microscopic roughness structure 10 is in a film form or a sheet form, the protective film-attached microscopic roughness structure 1 in which a protective film 20 is affixed to the microscopic roughness structure 10 is usually transported and stored in a state of being wound in a roll form. Therefore, the surface of the microscopic roughness structure 10 is maintained in a state of being tightly pressed against the adhesive layer 21 of the protective film 20, that is, in a state of being subjected to compressive stress. At this time, in the adhesive layer 21 where the compressive strength is weak, since the adhesive component of the adhesive layer 21 penetrates deeply into the concavities 14 of the microscopically rough structure over time, the adhesive force becomes strong, and as a result, a large amount of force (peeling force) is required to detach the protective film 20. If the peeling force surpasses the cohesive force of the adhesive layer 21, adhesive residue is generated. Furthermore, even if the adhesive residue does not occur in the beginning, the occurrence of the adhesive residue due to storage for a long time is not suitable for practical use. For such a reason, the adhesive layer 21 is required to have a cohesive force that would sufficiently surpass the adhesive force.

The inventors of the present invention paid attention to the compressive stress as an index of the cohesive force of the adhesive layer 21, and found that when the compressive stress of the adhesive layer 21 is set to a particular range, adhesive residue is not generated, while adhesiveness to the microscopic roughness structure 10 can be secured, that is, a balance between adhesiveness and low contaminability can be achieved.

In the present exemplary embodiment, the compressive stress obtainable when the adhesive layer 21 before being subjected to stress is compressed to a compression ratio of 20% in the thickness direction is 0.6 MPa to 3.0 MPa, preferably 0.6 MPa to 2.8 MPa, more preferably 1.0 MPa to 2.8 MPa, and even more preferably 1.55 MPa to 2.8 MPa.

When the compressive stress is 0.6 MPa or greater, as the microscopically rough structure is excessively encroached by the adhesive layer 21, and the contact area is increased, the peeling force is increased, and the peeling force surpassing the cohesive force of the adhesive layer 21 can be prevented. Therefore, the adhesive layer 21 is not easily subjected to cohesive failure at the time of detachment, and adhesive residue at the surface of the microscopic roughness structure 10 can be suppressed. On the other hand, when the compressive stress is 3.0 MPa or less, attachment to the microscopic roughness structure 10 is enabled. Furthermore, since the microscopically rough structure is appropriately encroached by the adhesive layer 21, and the contact area appropriately increases, the adhesiveness of the protective film 20 to the microscopic roughness structure 10 can be easily exhibited.

Meanwhile, the compressive stress also reflects the cohesive force of the adhesive layer 21, so that the compressive stress serves not only as the degree of penetration of the microscopically rough structure, but also as an index of stress for the cohesive failure of the adhesive layer 21.

The compressive stress of the adhesive layer 21 is a value measured as follows.

First, an adhesive component (adhesive composition) that constitutes the adhesive layer 21 is poured in between two sheets of glass plates, and while having a spacer with a thickness of about 2 mm interposed therebetween, the adhesive component is photocured to be molded into a plate shape. This plate is punched into a chip form that measures 1 cm on each side, and the resultant is used as a specimen for compression test.

A compressive stress is applied in the thickness direction of the specimen using a general tensile compression testing machine, the strain on that occasion is measured, and thus a compressive stress-strain curve is produced. It is desirable to perform the measurement in an environment at room temperature of 23° C. and a relative humidity of 65%.

In regard to the compression test, when the strain increases, the stress rises rapidly. Since the influence of the lot blurring of the specimens is prone to be significant, in the present invention, suitable properties of the adhesive layer 21 will be evaluated by the compressive stress at the time point when the specimen has been compressed up to 20% based on the thickness before the stress was applied.

Meanwhile, regarding the term compression at a compression ratio of 20%, for example, when the thickness of the specimen before stress is applied is 5 mm, the relevant compression refers to a state in which the specimen is compressed to an extent as much as 1 mm, which is 20% of the thickness.

In order to adjust the compressive stress of the adhesive layer 21 to the range described above, the adhesive layer 21 may be appropriately crosslinked.

The details regarding the various components included in the adhesive composition will be described in detail below, for example, in the case of forming the adhesive layer 21 by photocuring, it is preferable to incorporate, into the adhesive composition, a polymerizable component containing 2 mol % to 15 mol % of a crosslinkable monomer such as diacrylate, or a polyfunctional monomer, specific examples of which include polyalkylene glycol di(meth)acrylates (Polyethylene glycol di(meth)acrylate, polypropylene glycol di(meth)acrylate, and the like), alkyl di(meth)acrylates (1,6-hexanediol di(meth)acrylate, 1,9-nonanediol di(meth)acrylate, and the like), bifunctional monomers (ethoxylated bisphenol A di(meth)acrylate, epoxy diacrylate, urethane diacrylate, and the like), glycerin tri(meth)acrylate, pentaerythritol tri(meth)acrylate, pentaerythritol tetra(meth)acrylate, dipentaerythritol penta(meth)acrylate, dipentaerythritol hexa(meth)acrylate, and ethoxy-modification products thereof. More preferably, the content of the polyfunctional monomer is 3 mol % to 10 mol %, and even more preferably 5 mol % to 8 mol %.

Furthermore, in the case of forming the adhesive layer 21 by adding a compound such as diisocyanate to a polymer having a hydroxyl group in a side chain and performing post-crosslinking, it is preferable to add a crosslinking agent such that the content of the crosslinking agent would be 4 mol % or more of the monomer components that constitute the polymer, and the content may be controlled by the number of crosslinkable functional groups in the polymer, or may be adjusted based on the amount of the crosslinking agent to be added.

Furthermore, as described above, in order to suppress adhesive residue, it is important to increase the cohesive force of the adhesive layer 21 in order to suppress adhesive residue. In order to increase the cohesive force, it is suitable to incorporate a compound having a structure which can easily form hydrogen bonding to the adhesive composition. An example of the structure that can easily form hydrogen bonding may be a urethane bond, and the adhesive layer 21 may be formed by a method of performing post-crosslinking by means of an isocyanate compound, or a method of performing polymerization and crosslinking simultaneously by photocuring the composition using urethane acrylate.

Infrared Absorption Spectrum of Adhesive Layer:

In the infrared absorption spectrum of the surface of the adhesive layer 21, the ratio (B1/B2) between the peak area B1 having the absorption maximum in the region of 3700 $cm^{-1}$ to 3100 $cm^{-1}$, and the peak area B2 having the maximum absorption in the region of 1730±10 $cm^{-1}$ is preferably 0.6 to 1.3, more preferably 0.6 to 1.1, and even more preferably 0.7 to 1.0.

When the ratio B1/B2 is 0.6 or greater, the protective film 20 adheres satisfactorily by the microscopic roughness structure 10. When the ratio B1/B2 is 1.3 or less, the protective film 20 does not adhere to an extreme degree to the microscopic roughness structure 10, and the adhesive residue cannot be easily generated.

Furthermore, the ratio B1/B2 also reflects the cohesive force of the adhesive layer 21, so that the ratio serves not only as an index for the adhesiveness to the microscopic roughness structure 10, but also as an index of the cohesive force of the adhesive layer 21. When the ratio B1/B2 is 0.6 or greater, the cohesive force of the adhesive layer 21 itself also becomes sufficient, and the adhesive residue cannot be easily generated.

Meanwhile, the relationship between the ratio B1/B2 and the adhesiveness of the adhesive layer 21 to the microscopic roughness structure 10, and the like will be described in detail in the second exemplary embodiment that will be described below.

Storage Elastic Modulus E' of Adhesive Layer:

The adhesive layer 21 of the present exemplary embodiment is preferably such that the storage elastic modulus E' in the measurement of viscoelasticity is in the range of $1\times10^6$ Pa to $6\times10^6$ Pa at at least any one temperature in the range of 10° C. to 60° C. When the storage elastic modulus E' is $1\times10^6$ Pa or greater at at least any one temperature in the range of 10° C. to 60° C., an adhesive layer 21 in which adhesive residue does not easily occur is formed. When the storage elastic modulus E' is $6\times10^6$ Pa or less, the protective film 20 can be easily affixed to the microscopic roughness structure 10 by compression.

The storage elastic modulus E' of the adhesive layer 21 is more preferably in the range of $1\times10^6$ Pa to $6\times10^6$ Pa at at least any one temperature in the range of 10° C. to 40° C.

Here, the phrase "in the range of $1\times10^6$ Pa to $6\times10^6$ Pa at at least any one temperature in the range of 10° C. to 60° C." implies that in the measurement of the storage elastic modulus E', the storage elastic modulus E' exhibits a value of $1\times10^6$ Pa to $6\times10^6$ Pa at any temperature between 10° C. and 60° C. during the temperature increase. For example, this implies that it is still acceptable as long as the storage elastic modulus E' is $6\times10^6$ Pa at 60° C., even if the storage elastic modulus E' exhibits a value larger than $6\times10^6$ Pa up to 59° C. Thus, it is not necessarily essential that the storage elastic modulus E' be always in the range of $1\times10^6$ Pa to $6\times10^6$ Pa over the entire temperature region of 10° C. to 60° C.

The storage elastic modulus E' can be measured with a known viscoelasticity analyzer.

For example, an adhesive composition is molded into a film having a thickness of 500 μm, this film is punched to a strip form having a width of 5 mm to be used as a specimen, and the storage elastic modulus E' can be determined by making the measurement using a viscoelasticity analyzer under the conditions in the tensile mode, a distance between chucks of 2 cm, and a temperature increase from −50° C. to 100° C. at 1 Hz at a rate of 2° C./min.

Furthermore, the adhesive layer 21 of the present exemplary embodiment is preferably such that the storage elastic modulus E' in the rubbery plateau is in the range of $1.5\times10^6$ Pa or greater, more preferably $2\times10^6$ Pa or greater, and even more preferably $2\times10^6$ Pa to $6\times10^6$ Pa. When the storage elastic modulus E' in the rubbery plateau is $1.5\times10^6$ Pa or greater, an adhesive layer 21 in which adhesive residue does not easily occur is formed. Particularly, when the storage elastic modulus E' in the rubber plateau is $2\times10^6$ Pa or greater, even in the case where the protective film-attached the microscopic roughness structure 1 is stored for a long time in a harsh environment such as high temperature and high humidity, an adhesive layer 21 in which adhesive residue does not easily occur is formed. When the storage elastic modulus E' in the rubbery plateau is $6\times10^6$ Pa or less, the protective film 20 can be easily affixed to the microscopic roughness structure 10 by compression.

The rubbery plateau means, as illustrated in the graph of the storage elastic modulus E' (FIG. 7) of the adhesive layers of Examples 2-5 and 2-6 that will be described below, the storage elastic modulus E' is not dependent on temperature and retains an approximately constant value in a temperature region higher than or equal to the glass transition temperature. For an instance of reference, when the ratio of change between the storage elastic modulus E' at a certain temperature and the storage elastic modulus E' in a temperature region from that temperature to a temperature higher by 20° C. than that is in the range of (±10%), the region may be considered to be smooth.

Usually, when the adhesive composition is not crosslinked, the storage elastic modulus E' continuously decreases even in a temperature region higher than or equal to the glass transition temperature. The rubbery plateau is a phenomenon in which the adhesive composition seems to be crosslinked. Therefore, the storage elastic modulus E' in the rubbery plateau reflects the state of crosslinking of the adhesive composition.

Meanwhile, when the measurement of the storage elastic modulus E' is carried out in the tensile mode, if the polymer component included in the adhesive composition is not sufficiently crosslinked, the polymer component is slipped off at a temperature higher than the glass transition temperature, and the measurement of the storage elastic modulus E' may not be achieved. When it is said that the storage elastic modulus E' at 10° C. to 60° C. in the tensile mode cannot be measured, it is a phenomenon indicating a low degree of crosslinking, and it may be considered to imply that the storage elastic modulus E' in the rubbery plateau is not $1.5 \times 10^6$ Pa or greater.

Adhesive Composition:

The adhesive layer 21 of the present exemplary embodiment is formed using an adhesive composition. The adhesive composition contains at least an adhesive.

The adhesive may be any material capable of forming an adhesive layer 21 that satisfies at least the conditions of compressive stress described above, and having desired adhesiveness, and examples include urethane-based adhesives, rubber-based adhesives, silicone-based adhesives, and acrylic adhesives. Among them, from the viewpoint of having excellent transparency and durability, being preferable for optical film applications, also having high heat resistance, and being available at low cost, an acrylic adhesive is preferred.

The acrylic adhesive may be an acrylic copolymer obtained by copolymerizing an acrylate and another monomer.

Examples of the acrylate include ethyl acrylate, n-butyl acrylate, 2-ethylhexyl acrylate, isooctyl acrylate, isononyl acrylate, hydroxyethyl acrylate, 2-hydroxypropyl acrylate, propylene glycol acrylate, polypropylene glycol monoacrylate, acrylamide, glycidyl acrylate, and cyclohexanedimethanol monoacrylate. Regarding the acrylate, one kind may be used alone, or two or more kinds may be used in combination.

Examples of the other monomer include methyl acrylate, methyl methacrylate, styrene, acrylonitrile, vinyl acetate, acrylic acid, methacrylic acid, itaconic acid, hydroxyethyl methacrylate, methacryl amide, glycidyl methacrylate, dimethylaminoethyl methacrylate, tert-butylaminoethyl methacrylate, and n-ethylhexyl methacrylate. Among them, n-ethylhexyl methacrylate is preferred. Regarding the other monomer, one kind may be used alone, or two or more kinds may be used in combination.

Furthermore, a monomer having a bulky side chain tends to decrease the glass transition temperature of a copolymer and make it easier for the copolymer to exhibit adhesive force. Regarding such a monomer, polyoxyalkylene monoacrylates, long-chain alkyl acrylates, and the like are known. When these monomers are used in an appropriate amount as the other monomer, the adhesive layer 21 can acquire suitable properties. However, when the monomer is used in a large amount, polymerization and curing occurs insufficiently, and may remain in the adhesive layer 21 as an unreacted monomer. An unreacted monomer may bleed out as a low molecular weight component, causing adhesive residue. Therefore, the content of the monomer having a bulky side chain is preferably less than 40% by mass, and more preferably less than 30% by mass, relative to 100% by mass of the sum of the amounts of the acrylate and the other monomer.

The unit ratio (acrylate/other monomer) between the acrylate and the other monomer that are included in the acrylic copolymer may have any value as long as the acrylic copolymer can exhibit desired adhesive force, and can be appropriately set according to the use of the protective film 20 or the like.

Furthermore, the mass average molecular weight (Mw) of the acryliccopolymer may be any value as long as the acrylic copolymer can exhibit desired adhesive force, and is not particularly limited.

The adhesive composition may contain a crosslinking agent.

Examples of the crosslinking agent include an epoxy-based crosslinking agent and an isocyanate-based crosslinking agent.

The epoxy-based crosslinking agent may be a polyfunctional epoxy-based compound.

Examples of the polyfunctional epoxy-based compound include sorbitol polyglycidyl ether, polyglycerol polyglydicyl ether, pentaerythritol polyglycidyl ether, diglycerol polyglycidyl ether, glycerol polyglycidyl ether, trimethylolpropane polyglycidyl ether, neopentyl glycol diglycidyl ether, 1,6-hexanediol diglycidyl ether, hydrogenated bisphenol A diglycidyl ether, polyethylene glycol diglycidyl ether, polypropylene glycol diglycidyl ether, and polybutadiene diglycidyl ether.

Examples of the isocyanate-based crosslinking agent include a polyisocyanate compound; a trimer of a polyisocyanate compound; a urethane prepolymer having an isocyanate group at a chain end, which is obtainable by allowing a polyisocyanate compound to react with a polyol compound; and a trimer of such a urethane prepolymer.

Examples of the polyisocyanate compound include 2,4-tolylene diisocyanate, 2,5-tolylene diisocyanate, 1,3-xylene diisocyanate, 1,4-xylene diisocyanate, diphenylmethane-4, 4'-diisocyanate, 3-methyldiphenylmethane diisocyanate, hexamethylene diisocyanate, isophorone diisocyanate, dicyclohexylmethane-4,4'-diisocyanate, dicyclohexylmethane-2,4'-diisocyanate, and lysine isocyanate.

Furthermore, it is also allowable to use a urethane acrylate having two or more polymerizable sites in one molecule. Since adjustment of the degree of crosslinking can easily reflect the composition ratio of the feed, it is preferable to use a polyfunctional monomer.

Regarding the urethane acrylate, a commercially available product may be used, or a product obtained by allowing an acryloyl group-containing compound to react with an isocyanate compound at a suitable ratio may also be used. Examples of the commercially available product include "EBECRYL (registered trademark)" series manufactured by Daicel-Cytec Co., Ltd.; ARONIX (registered trademark) M1200 manufactured by Toagosei Co., Ltd.; and SHIKOH series manufactured by Nippon Synthetic Chemical Industry Co., Ltd.

The content of the crosslinking agent may vary with the kind of the crosslinking agent, but the content is preferably 1 part to 40 parts by mass, and more preferably 5 parts to 30 parts by mass, relative to 100 parts by mass of the adhesive. When the content of the crosslinking agent is 1 part by mass or more, as the adhesive is crosslinked, the cohesive force is increased, and the adhesive reside is not easily generated. When the content of the crosslinking agent is 40 parts by mass or less, the crosslinking density does not increase excessively, and the protective film 20 can be easily affixed to the microscopic roughness structure 10 by compression.

The adhesive composition may further contain a metal chelating agent.

The metal chelating agent has a site capable of forming a salt with a metal element, and when used together with an adhesive, the metal chelating agent be crosslinked as a result of chelate bonding between a metal element and a carboxyl group or the like carried by the adhesive.

Examples of the metal chelating agent include aluminum chelate compounds (aluminum isoprepylate, aluminum butyrate, aluminum ethylate, aluminum ethyl acetoacetate, aluminum acetyl acetonate, aluminum acetyl acetonate bis(ethyl acetoacenate), aluminum alkyl acetoacenate, and the like), titanium chelate compounds (dipropoxybis(acetyl acetonate)titanium, dibutoxytitanium bis(octylene glycolate), dipropoxytitanium bis(ethyl acetoacetate), dipropoxytitanium bis(lactate), dipropoxytitanium bis(triethanol aminate), di-n-butoxytitanium bis(triethanol aminate), tri-n-butoxytitanium monostearate, butyl titanate dimer, poly(titanium acetyl acetonate), and the like), zirconium chelate compounds (zirconium tetraacetyl acetonate, zirconium monoacetyl acetonate, zirconium bis(acetyl acetonate), zirconium acetyl acetonate bis(ethyl acetoacetate), zirconium acetate, and the like), organic carboxylic acid metal salts (zinc octylate, zinc laurate, zinc stearate, tin octylate, and the like), and zinc chelate compounds (acetylacetone zinc chelate, benzoyl acetone zinc chelate, dibenzoylmethane zinc chelate, ethyl acetoacetate zinc chelate, and the like). Among them, from the viewpoint that the rate of crosslinking at which the adhesive is crosslinked can be easily adjusted, aluminum chelate compounds (aluminum isoprepylate, aluminum butyrate, aluminum ethylate, aluminum ethyl acetoacetate, aluminum acetyl acetonate, aluminum acetyl acetonate bis(ethyl acetoacenate), aluminum alkyl acetoacenate, and the like) are preferred.

The content of the metal chelating agent may vary depending on the kind of the metal chelating agent, but the content is preferably 0.06 parts to 0.50 parts by mass relative to 100 parts by mass of the adhesive. When the content of the metal chelating agent is less than 0.06 parts by mass, the rate of crosslinking at the time of forming the adhesive layer 21 is late, and there is a risk that productivity may deteriorate. If the content of the metal chelating agent exceeds 0.50 parts by mass, the effect just reaches the limitation, while the cost increases.

The adhesive composition may further include other additives.

In the case in which the adhesive is a photosensitive adhesive formed by polymerizing a photosensitive monomer component that is cured by light irradiation, such as an acrylate and another monomer that constitute an acrylic adhesive, and an adhesive composition containing the photosensitive adhesive is applied on a film base material 22 and then subjected to polymerization and curing by irradiation with ultraviolet radiation or visible light to form an adhesive layer 21, an active energy ray polymerization initiator is incorporated as the other additive.

An active energy ray polymerization initiator is a compound which undergoes cleavage as a result of irradiation of active energy radiation, and generates a radical that initiates a polymerization reaction. The active energy radiation is preferably ultraviolet radiation from the viewpoint of the apparatus cost or productivity.

Examples of the active energy ray polymerization initiator include benzophenone, 4,4-bis(diethylamino)benzophenone, 2,4,6-trimethylbenzophenone, methyl ortho-benzoylbenzoate, 4-phenylbenzophenone, t-butylanthraquinone, 2-ethylanthraquinone, thioxanthones (2,4-diethylthioxanthone, isopropylthioxanthone, 2,4-dichlorothioxanthone, and the like), acetophenones (diethoxyacetophenone, 2-hydroxy-2-methyl-1-phenylpropan-1-one, benzyl dimethyl ketal, 1-hydroxycyclohexyl phenyl ketone, 2-methyl-2-morpholino(4-thiomethylphenyl)propan-1-one, 2-benzyl-2-dimethylamino-1-(4-morpholinophenyl)butanone, and the like), benzoin ethers (benzoin methyl ether, benzoin ethyl ether, benzoin isopropyl ether, benzoin isobutyl ether, and the like), acylphosphine oxides (2,4,6-trimethylbenzoyldiphenylphosphine oxide, bis(2,6-dimethoxybenzoyl)-2,4,4-trimethylpentylphosphine oxide, bis(2,4,6-trimethylbenzoyl)phenylphosphine oxide, and the like), methylbenzoyl formate, 1,7-bisacridinylheptane, and 9-phenylacridine. Regarding the active energy ray polymerization initiator, one kind may be used alone, or two or more kinds may be used in combination. Particularly, it is preferable to use two or more kinds having different absorption wavelengths in combination.

Furthermore, if necessary, thermal polymerization initiators such as peroxides (persulfuric acid salts such as potassium persulfate and ammonium persulfate, benzoyl peroxide, and the like), and azo-based initiators may also be used in combination.

The content of the active energy ray polymerization initiator is preferably 0.01 parts to 10 parts by mass, more preferably 0.1 parts to 5 parts by mass, and even more preferably 0.2 parts to 3 parts by mass, relative to 100 parts by mass of the sum of the contents of all the monomers included in the adhesive composition. When the content of the active energy ray polymerization initiator is 0.01 parts by mass or more, the adhesive composition has excellent curability, and the cured product (adhesive layer 21) has satisfactory mechanical characteristics, particularly scratch resistance. When the content of the active energy ray polymerization initiator is 10 parts by mass or less, the decrease in the elastic modulus and scratch resistance caused by the polymerization initiator remaining in the cured product, or coloration can be suppressed.

Furthermore, the adhesive composition may also contain an active energy ray absorber, an oxidation inhibitor, and the like as the other additives.

The active energy ray absorber is preferably a compound capable of absorbing the active energy radiation that is irradiated at the time of curing of the adhesive composition, and suppressing deterioration of the resin. Examples of the active energy ray absorber include benzophenone-based ultraviolet absorbers, benzotriazole-based ultraviolet absorbers, and benzoate-based ultraviolet absorbers. Examples of commercially available products include TINUVIN series 400 and 479 manufactured by Ciba Specialty Chemicals Corp.; and VIOSORB series 110 manufactured by Kyodo Chemical Co., Ltd.

Examples of the oxidation inhibitor include phenol-based oxidation inhibitors, phosphorus-based oxidation inhibitors, sulfur-based oxidation inhibitors, and hindered amine-based oxidation inhibitors. Examples of commercially available products include IRGANOX series manufactured by Ciba Specialty Chemicals Corp.

Regarding the active energy ray absorbers and the oxidation inhibitors, one kind may be used alone, or two or more kinds may be used in combination.

The content of the active energy ray absorber and/or the oxidation inhibitor is preferably 0.01 parts to 5 parts by mass, more preferably 0.01 parts to 1 part by mass, and even more preferably 0.01 parts to 0.5 pats by mass, relative to 100 parts by mass of the sum of the contents of all the monomers included in the adhesive composition.

When the content of the active energy ray absorber and/or the oxidation inhibitor is 0.01 parts by mass or more, yellowing of the cured product or an increase in the haze is suppressed, and weather resistance can be increased. When the content of the active energy ray absorber and/or the oxidation inhibitor is 5 parts by mass or less, curability of the adhesive composition, scratch resistance of the cured product, and adhesiveness of the cured product to the film base material 22 can be made more satisfactory.

Furthermore, the adhesive composition may include, if necessary, other additives such as a mold releasing agent, a lubricating agent, a plasticizer, an antistatic agent, a photostabilizer, a flame retardant, a flame retardant aid, a polymerization inhibitor, a filler, a silane coupling agent, a coloring agent, a reinforcing agent, an inorganic filler, and an impact resistance modifier.

Furthermore, the adhesive composition may include a solvent, but it is not preferable that the composition do not contain a solvent. When the adhesive composition does not contain a solvent, for example, in the process of applying the adhesive composition on a film base material 22, subjecting the adhesive composition to polymerization and curing by irradiation of active energy radiation, and thereby forming an adhesive layer 21, there is no risk that the solvent may remain in the cured product. Also, in consideration of the production process, investment for the facilities for solvent removal is unnecessary, and it is also preferable in view of cost.

In the present invention, since it is preferable to relatively reduce the content of low molecular weight components in the adhesive layer 21, when additives such as a crosslinking agent, a metal chelating agent, an oxidation inhibitor, an active energy ray absorber and an active energy ray polymerization initiator become the low molecular weight components, it is preferable that the content of such additives be relatively smaller, and it is particularly preferable that the adhesive layer 21 do not include additives that become the low molecular weight components.

Film Base Material:

It is desirable that the film base material 22 of the present exemplary embodiment have sufficient strength so that no damage occurs in the microscopic roughness structure 10 to be protected.

Examples of the material for the film base material 22 include olefin-based resins (polyethylene, polypropylene, polyvinyl alcohol, an ethylene-vinyl alcohol copolymer, and the like), fluorine-based resins (polyethylene fluoride, polyvinylidene fluoride, a tetrafluoroethylene-perfluoroalkyl vinyl ether copolymer, and the like), chlorine-based resins (polyvinyl chloride, polyvinylidene chloride, and the like), acrylic resins (polymethyl methacrylate and the like), sulfone-based resins (polyether sulfone and the like), ketone-based resins (polyether ether ketone and the like), thermoplastic polyesters (polyethylene terephthalate, polyethylene naphthalate, and the like), polyimides, and polyamides. Among them, from the viewpoint that a film base material 22 which has excellent transparency, is suitable particularly when the microscopic roughness structure 10 is used in an optical application and has satisfactory smoothness, may be obtained, polyethylene terephthalate is preferred. Furthermore, if the film base material 22 has excellent transparency, the condition of the microscopic roughness structure 10 would be possibly inspected through the protective film 20.

In order to enhance the adhesive force between the film base material 22 and the adhesive layer 21, the film base material 22 may be subjected to a surface treatment such as a corona treatment or a plasma treatment on the surface on the side where the adhesive layer 21 is formed, coating of an undercoating agent (primer), or the like.

The thickness of the film base material 22 may be any thickness that can be attached with satisfactory adhesiveness when the film base material is affixed to the microscopic roughness structure 10, and is capable of sufficiently protecting the microscopic roughness structure 10 from damage or the like, and the thickness is appropriately set according to the use of the protective film 20 or the like. However, the thickness is usually about 12 µm to 100 µm, preferably 16 µm to 80 µm, and more preferably 25 µm to 50 µm. If the thickness of the film base material 22 is larger than 100 µm, there is a risk that it may be difficult for the film base material to be affixed to the microscopic roughness structure 10 with satisfactory adhesiveness. If the thickness of the film base material 22 is less than 12 µm, there is a risk that it may be difficult for the film base material to protect the microscopic roughness structure 10 satisfactorily from damage or the like.

Method for Producing Protective Film:

The protective film 20 of the present exemplary embodiment can be produced by a method of applying an adhesive composition on the surface of the film base material 22; a method of transferring the adhesive layer 21 to the surface of the film base material 22; a method of molding by subjecting an adhesive composition and the material of the film base material 22 to melt co-extrusion; a method of molding an adhesive composition and the material of the film base material 22 respectively into film forms by an extrusion molding method or the like, and then bonding the films; or the like.

Among them, from the viewpoint that an adhesive layer 21 having satisfactory smoothness can be formed, the method of applying an adhesive composition on the surface of the film base material 22 is preferred.

Furthermore, the adhesive layer 21 may be formed by applying a mixture of a polymer solution with a crosslinking agent such as an isocyanate compound on the surface of the film base material 22, and curing by applying heat or the like, or may be formed by applying an adhesive composition to a predetermined thickness on the surface of the film base material 22, and curing by irradiation of active energy radiation.

In a case in which the adhesive layer 21 is exposed, the adhesive layer 21 may be protected with a separator such as a peelable sheet or a peelable film, which has been treated with a release agent, until the protective film 20 is put to practical use. Particularly, when the surface roughness Ra of the separator is appropriately set, the surface roughness Ra of the adhesive layer 21 after the release of the separator can be controlled easily.

Examples of the separator include appropriate thin bodies such as plastic films (films of polyethylene, polypropylene, polyethylene terephthalate, polyester, and the like), porous materials (paper, cloth, non-woven fabric, and the like), nets, foamed sheets, metal foils, and laminates thereof.

Among them, plastic films are preferred from the viewpoint of having excellent surface smoothness.

When the adhesive layer 21 is protected with a separator, the adhesive layer 21 may be formed on the surface of the film base material 22, and then the separator may be laminated on the adhesive layer 21. Alternatively, an adhesive composition may be interposed between the film base material 22 and the separator, the adhesive composition may be cured by irradiating active energy radiation, and thereby the adhesive layer 21 may be formed between the film base material 22 and the separator.

Characteristics of Protective Film:

It is desirable that the peeling strength (peeling force) of the protective film 20 of the present exemplary embodiment be at a level of enable adhesion to the microscopic roughness structure 10, and the peeling strength is preferably 0.010 N/25 mm to 5.000 N/25 mm, more preferably 0.010 N/25 mm to 3.000 N/25 mm, and even more preferably 0.015 N/25 mm to 1.000 N/25 mm, with respect to the microscopic roughness structure 10. When the peeling strength is in the range described above, the protective film can adhere to the microscopic roughness structure 10 with sufficient strength, and when not needed, the protective film can be easily detached from the microscopic roughness structure.

The peeling strength of the protective film 20 is measured as follows.

A protective film 20 is cut into a strip-shaped specimen having a size of 25 mm in width×150 mm in length, and then the specimen is laminated to an object for attachment having a microscopically rough structure on the surface, under the conditions according to the specifications of JIS Z0237. Then, the peeling strength obtainable when the specimen is peeled off in the length direction of the specimen under the conditions of a peeling angle of 180° and a peeling rate of 300 mm/min at room temperature, is measured. For the measurement of the peeling strength, for example, Universal Testing Machine 5565 manufactured by Instron Corp. can be used.

Regarding the object for attachment having a microscopically rough structure on the surface, usually an object for attachment that is actually attached with a protective film 20 is used.

Second Exemplary Embodiment

The protective film-attached microscopic roughness structure related to the second exemplary embodiment of the present invention includes, for example, as illustrated in FIG. 1, a microscopic roughness structure 10 and a protective film 20.

(Microscopic Roughness Structure)

The microscopic roughness structure 10 of the present exemplary embodiment includes, as illustrated in FIG. 2, a base material 11, and a cured product 12 having a microscopically rough structure on the surface, which is formed on the surface of the base material 11.

Base Material:

The base material 11 of the present exemplary embodiment is the same as the base material 11 of the first exemplary embodiment.

Cured Product:

The cured product 12 of the present exemplary embodiment is formed from a cured product of a resin composition, and has a microscopically rough structure on the surface.

The microscopically rough structure is formed from conically shaped convexities 13 and concavities 14 that are aligned at an equal interval.

The period of the microscopically rough structure of the cured product 12 of the present exemplary embodiment, the height of the convexity 13, and the shape of the convexity 13 are the same as those of the cured product 12 of the first exemplary embodiment.

Infrared Absorption Spectrum of Cured Product:

However, as described above, when the period of the microscopically rough structure is several nanometers (nm) to several hundred nanometers (nm), since the interval between the convexities 13 is narrow, the contact area of the microscopic roughness structure 10 and the protective film 20 is small, and it is difficult for the protective film 20 to sufficiently adhere to the microscopic roughness structure 10.

Thus, the inventors of the present invention conducted a thorough investigation, and as a result, the inventors found that a decrease in adhesiveness that is attributable to the period of the microscopically rough structure can be ameliorated by the properties of the cured product 12. When the cured product 12 is formed using a resin composition, the adhesiveness is changed by the functional group or compound existing on the surface. For example, it is already known that when a fluorine coating treatment is carried out, contamination does not easily adhere, and when a silicone treatment is carried out, friction of the surface is lowered. As such, when a material having low polarity is used, the adhesiveness tends to decrease. On the contrary, when there are available functional groups capable of forming hydrogen bonding, such as a hydroxyl group and an amide group, at the surface in a large amount, the adhesiveness tends to increase.

The inventors of the present invention paid attention to a hydroxyl group or an amide group as the functional group that contributes to an increase in adhesiveness.

A hydroxyl group is such that due to the difference in electronegativity between the oxygen atom and the hydrogen atom, the oxygen atom is slightly negatively charged, and the hydrogen atoms are slightly positively charged. Furthermore, the hydroxyl group is a functional group in which the unshared pair of electrons present in the oxygen atom are likely to interact with protons, and can easily form the so-called hydrogen bonding.

An amide group is such that due to the difference in electronegativity between the nitrogen atom and the hydrogen atom, the nitrogen atom is slightly negatively charged, and the hydrogen atom is slightly positively charged. Furthermore, the amide group is a functional group in which the unshared pair of electrons present in the nitrogen atom are likely to interact with protons, and can easily form the so-called hydrogen bonding.

A polymer compound which can easily form hydrogen bonding intramolecularly or intermolecularly has high cohesive force, is likely to have high strength and high elasticity, and cannot be easily fractured.

Regarding the method for evaluating the amount of these hydroxyl groups or amide groups, an infrared spectrometric method is known.

The infrared spectrometric method is a method of irradiating a sample with infrared radiation, and measures the energy absorption corresponding to the vibration of molecules, and an ATR method (attenuated total reflectance method) allows a sample to closely adhere to a high refractive index medium (prism) and utilizes total reflection of infrared radiation occurs at the interface between the medium and the sample. This is to measure the evanescent waves generated when infrared radiation slightly penetrates into the interior of a sample at the time of reflection, and is used in a structural analysis of the surface of a sample, or the like.

Regarding the sample, a sample that has been left to stand for one whole day and night or longer in a chamber conditioned at a temperature of 23° C. and a relative humidity of 50% is used.

Regarding the apparatus, any apparatus capable of measuring the infrared absorption spectrum may be used, and an example may be FT-IR AVATAR 330 manufactured by Nicolet Corp.

The measurement is carried out by, for example, fixing a predetermined tool using a prism made of diamond and using an ATR method under the conditions of a measurement wave number of 4000 cm$^{-1}$ to 700 cm$^{-1}$, a resolution of 4 cm$^{-1}$, and a cumulative number of 64 times.

From the infrared absorption spectrum thus obtained, the ratio of the peak area of C=O stretching vibration ($S_{C=O}$) and the peak area of OH stretching vibration ($S_{OH}$) ($S_{OH}/S_{C=O}$) of an ester bond is determined using, for example, the peak area tool of OMNIC E.S.P. Software Package.

Figure 4:
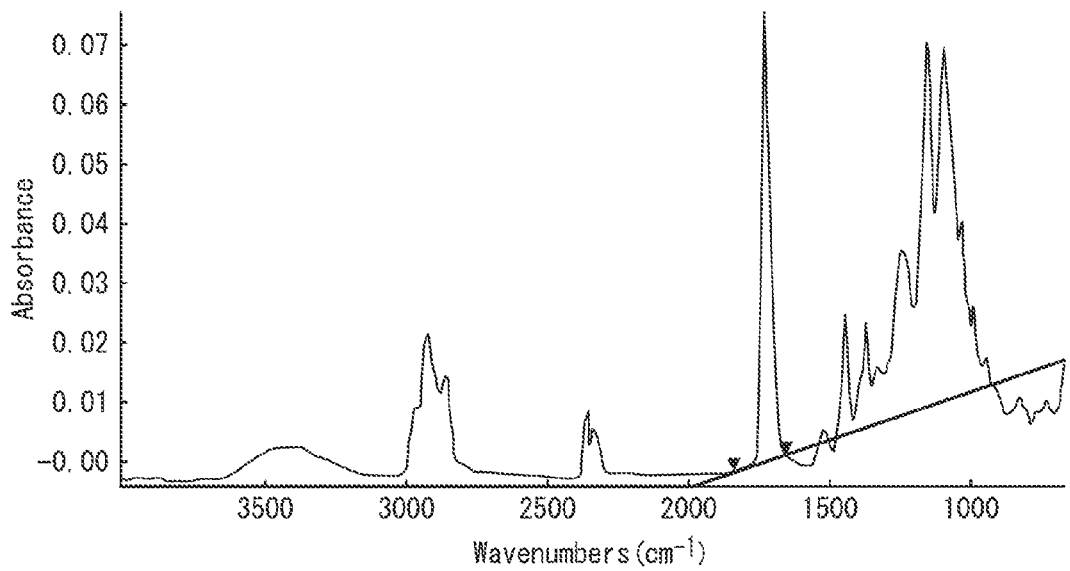
FIG. 4 is an infrared absorption spectrum explaining the method of drawing the baseline when the peak area of the C=O stretching vibration of an ester bond is determined.
Figure 5:
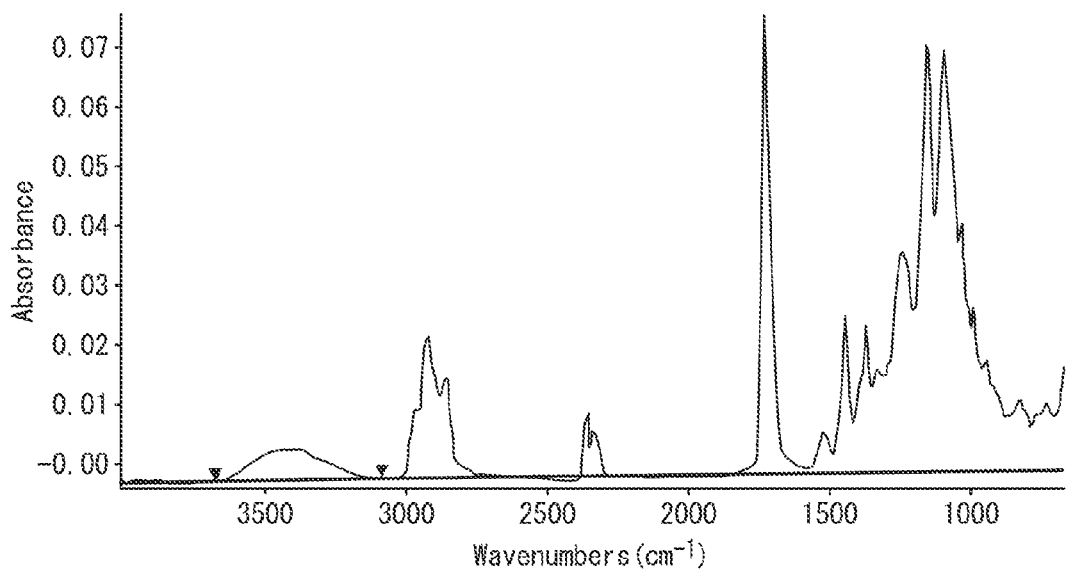
FIG. 5 is an infrared absorption spectrum explaining the method of drawing the baseline when the peak area of the OH stretching vibration is determined.

The peak area of C=O stretching vibration of an ester bond is defined as the area of an absorption curve having the absorption maximum in the region of 1730±10 cm$^{-1}$, and the peak area of OH stretching vibration is defined as the area of an absorption curve having the absorption maximum in the region of 3700 cm$^{-1}$ to 3100 cm$^{-1}$. The baseline is defined, as illustrated in FIG. 4 and FIG. 5, as the line that connects the bases on both sides of each absorption curve, or the valleys between different absorption curves.

An absorption curve having the absorption maximum in the region of 3700 cm$^{-1}$ to 3100 cm$^{-1}$ in the infrared absorption spectrum reflects the state of formation of hydrogen bonding originating from a hydroxyl group or an amide group.

An absorption curve having the absorption maximum in the region of 1730±10 cm$^{-1}$ in the infrared absorption spectrum is, in the case of using (meth)acrylate as a polymerizable component, a peak originating from carbonyl that is essentially contained in the (meth)acryloyl group.

The ratio ($S_{OH}/S_{C=O}$) of the peak area of C=O stretching vibration ($S_{C=O}$) and the peak area originating from OH stretching vibration ($S_{OH}$) of an ester bond is a value that quantitatively reflects the hydrogen bonding forming capability of the surface.

According to the present exemplary embodiment, in the infrared absorption spectrum of the surface of the microscopically rough structure of the microscopic roughness structure 10, that is, the surface of the cured product 12, the ratio (A1/A2) between the peak area A1 having the absorption maximum in the region of 3700 cm$^{-1}$ to 3100 cm$^{-1}$, and the peak area A2 having the absorption maximum in the region of 1730±10 cm$^{-1}$ is 0.1 to 0.8, preferably 0.2 to 0.7, and more preferably 0.3 to 0.6.

When the ratio is A1/A2 is 0.1 or greater, there are available many functional groups that are capable of forming hydrogen bonding at the surface, and the protective film 20 adheres satisfactorily to the microscopic roughness structure 10. When the ratio A1/A2 is 0.8 or less, the phenomenon in which the microscopic roughness structure 10 absorbs water, and thereby the convexities 13 draw closer to each other due to surface tension, can be avoided.

In order to adjust the ratio A1/A2 to 0.1 or greater, it is convenient to incorporate a hydrophilic polymerizable component into the material of the cured product 12 (resin composition). For example, a polymerizable component having a hydroxyl group at the end of a side chain, a polyfunctional monomer having some residual hydroxyl groups, a monomer having a urethane bond, and the like are used.

Furthermore, the A1/A2 can be adjusted to 0.8 or less by appropriately adjusting the amount of use of the hydrophilic polymerizable component.

Examples of the polymerizable component having a hydroxyl group at the end of a side chain include 2-hydroxyethyl (meth)acrylate, 2-hydroxypropyl (meth)acrylate, 4-hydroxybutyl (meth)acrylate, and terminal hydroxyl group type polyethylene glycol monoacrylate.

Examples of the polyfunctional monomer having some residual hydroxyl groups include pentaerythritol tri(meth)acrylate, and dipentaerythritol hexa(meth)acrylate.

Examples of the monomer having a urethane bond include a compound obtained by allowing a compound having isocyanate groups (hexamethylene diisocyanate, trimer of hexamethylene diisocyanate, isophorone diisocyanate, trimer of isophorone diisocyanate, or the like) to directly react with a monomer having a hydroxyl group (2-hydroxyethyl acrylate or the like); and a compound obtained by introducing a polymerizable reactive group to a side chain or an end of a polyurethane produced by allowing an isocyanate compound and a polyol compound to react.

Examples of commercially available products of the hydrophilic polymerizable component include EBECRYL (registered trademark) series of Daicel-Cytec Co., Ltd.; ARONIX (registered trademark) series manufactured by Toagosei Co., Ltd.; and KAYARAD (registered trademark) series manufactured by Nippon Kayaku Co., Ltd.

Fingerprint removability of microscopic roughness structure:

However, as described above, when the microscopic roughness structure 10 is used as an antireflective film or the like, the microscopic roughness structure 10 is used by being attached to the surface of an object such as a display. Therefore, since there are many chances of being touched by human hands, it is preferable that the microscopic roughness structure 10 have fingerprint removability, by which any fingerprint contamination attached thereto upon use can be removed. Specifically, it is preferable that fingerprint contamination can be removed by wiping with a damp cloth, as described in WO 2008/096872.

Determination of whether fingerprint contamination can be removed by wiping with a damp cloth is carried out by, for example, the method previously illustrated in the description of the first exemplary embodiment.

When the ratio A1/A2 is 0.1 to 0.8, as described above, since the protective film 20 adheres satisfactorily to the microscopic roughness structure 10, and the surface on the microscopically rough structure side of the microscopic roughness structure 10 becomes hydrophilic, water spreads wetting between the contamination attached to the surface of the microscopic roughness structure 10 and the surface of the microscopic roughness structure 10, and lifts the contamination, and thereby the removal of the contamination is enabled. Therefore, fingerprint contamination can be easily removed by wiping with a damp cloth.

Use of Microscopic Roughness Structure:

Since the microscopic roughness structure 10 of the present exemplary embodiment has, on the surface, a microscopically rough structure having a period less than or equal to the wavelength of visible light, the microscopic roughness structure 10 is suitable for optical applications, particularly as an antireflective article such as an antireflective film or a three-dimensionally shaped antireflective body.

Other Forms of Microscopic Roughness Structure:

The microscopic roughness structure 10 of the present exemplary embodiment is not limited to that illustrated in FIG. 2.

Regarding other forms of the microscopic roughness structure 10 of the present exemplary embodiment, those previously illustrated in the description of the first exemplary embodiment may be mentioned.

Intermediate Layer:

Furthermore, the microscopic roughness structure 10 of the present exemplary embodiment may have, as illustrated in FIG. 3, an intermediate layer 15 between the base material 11 and the cured product 12, for the purpose of enhancing various properties such as scratch resistance and adhesiveness.

The material of the intermediate layer 15 is the same as the material of the intermediate layer 15 of the first exemplary embodiment.

(Protective Film)

The protective film 20 of the present exemplary embodiment is to protect the surface of the microscopic roughness structure 10, and as illustrated in FIG. 1, the protective film 20 can be attached to the surface on the microscopically rough structure side of the microscopic roughness structure 10.

The protective film 20 includes a film base material 22, and an adhesive layer 21 formed on the surface of the film base material 22.

Adhesive Layer:

The adhesive layer 21 of the present exemplary embodiment is in contact with the surface on the microscopically rough structure side of the microscopic roughness structure 10.

The thickness of the adhesive layer 21 is preferably 3 μm to 200 μm, more preferably 3 μm to 100 μm, and even more preferably 3 μm to 50 μm.

Infrared Absorption Spectrum of Adhesive Layer:

As described above, the inventors of the present invention conducted a thorough investigation, and as a result, the inventors found that in order to solve the problem of adhesive residue while acquiring excellent adhesiveness, a cohesive force that would sufficiently surpass the adhesive force between the surface of the microscopic roughness structure 10 and the adhesive layer 21 is required in the adhesive layer 21. The reason for this is as explained in connection with the first exemplary embodiment.

Then, the inventors of the present invention paid attention to the formation of intramolecular or intermolecular hydrogen bonding as an index of the cohesive force of the adhesive layer 21, and thus found that in the infrared absorption spectrum of the surface of the adhesive layer 21, the ratio ($S_{OH}/S_{C=O}$) of the peak area of C=O stretching vibration ($S_{C=O}$) and the peak area originating from OH stretching vibration ($S_{OH}$) of an ester bond is set to a particular range, adhesive residue is not generated, while the adhesiveness to the microscopic roughness structure 10 can also be secured, that is, a balance can be achieved between adhesiveness and low contaminability.

In the present exemplary embodiment, the ratio (B1/B2) of the peak area B1 having the absorption maximum in the region of 3700 $cm^{-1}$ to 3100 $cm^{-1}$ and the peak area B2 having the absorption maximum in the region of 1730±10 $cm^{-1}$ in the infrared absorption spectrum of the surface of the adhesive layer 21, is 0.6 to 1.3, preferably 0.6 to 1.1, and more preferably 0.7 to 1.0.

When the ratio B1/B2 is 0.6 or greater, there are available many functional groups that are capable of forming hydrogen bonding at the surface, and the protective film 20 adheres satisfactorily to the microscopic roughness structure 10. When the ratio B1/B2 is 1.3 or less, adhesive residue does not easily occur, while the protective film 20 does not extremely adheres to the microscopic roughness structure 10.

Furthermore, the ratio B1/B2 also reflects the cohesive force of the adhesive layer 21, so that the ratio serves not only as an index for the adhesiveness to the microscopic roughness structure 10, but also as an index of the cohesive force of the adhesive layer 21. When the ratio B1/B2 is 0.6 or greater, the cohesive force of the adhesive layer 21 itself also becomes sufficient, and the adhesive residue cannot be easily generated.

In order to adjust the ratio B1/B2 to 0.6 to 1.3, it is convenient to incorporate a hydrophilic polymerizable component into the material of the adhesive layer 21 (adhesive composition), similarly to the surface of the microscopic roughness structure 10. For example, a polymerizable component having a hydroxyl group at the end of a side chain, a polyfunctional monomer with some residual hydroxyl groups, a monomer having a urethane bond, and the like are used.

Storage Elastic Modulus E' of Adhesive Layer:

The adhesive layer 21 of the present exemplary embodiment is preferably such that the storage elastic modulus E' in the rubbery plateau is preferably in the range of $1.5 \times 10^6$ Pa or greater, and more preferably $1.5 \times 10^6$ Pa to $6 \times 10^6$ Pa. When the storage elastic modulus E' in the rubbery plateau is $1.5 \times 10^6$ Pa or greater, an adhesive layer 21 in which adhesive residue does not easily occur is formed. When the storage elastic modulus E' in the rubbery plateau is $6 \times 10^6$ Pa or less, the protective film 20 can be easily affixed to the microscopic roughness structure 10 by compression.

Regarding the rubbery plateau, the same as that described in the first exemplary embodiment is applied.

It is more preferable that the storage elastic modulus E' of the adhesive layer 21 of present exemplary embodiment be in the range of $1.5 \times 10^6$ Pa to $6 \times 10^6$ Pa at at least any one temperature in the range of 10° C. to 60° C.

The phrase "in the range of $1.5 \times 10^6$ Pa to $6 \times 10^6$ Pa at at least any one temperature in the range of 10° C. to 60° C." implies that in the measurement of the storage elastic modulus E', the storage elastic modulus E' exhibits a value of $1.5 \times 10^6$ Pa to $6 \times 10^6$ Pa at any temperature between 10° C. and 60° C. during the temperature increase. For example, this implies that it is still acceptable as long as the storage elastic modulus E' is $6 \times 10^6$ Pa at 60° C., even if the storage elastic modulus E' exhibits a value larger than $6 \times 10^6$ Pa up to 59° C. Thus, it is not necessarily essential that the storage elastic modulus E' be always in the range of $1.5 \times 10^6$ Pa to $6 \times 10^6$ Pa over the entire temperature region of 10° C. to 60° C.

Regarding the method for measuring the storage elastic modulus E', the same as that described in the first exemplary embodiment applies.

Adhesive Composition:

The adhesive layer 21 of the present exemplary embodiment is formed by an adhesive composition.

The adhesive composition of the present exemplary embodiment is the same as the adhesive composition of the first exemplary embodiment.

Film Base Material:

The film base material 22 of the present exemplary embodiment may be any film base material having sufficient strength so that the microscopic roughness structure 10 to be protected is not damaged.

The film base material 22 of the present exemplary embodiment is the same as the film base material 22 of the first exemplary embodiment.

Method for Producing Protective Film:

The method for producing the protective film 20 of the present exemplary embodiment is the same as the method for producing the protective film 20 of the first exemplary embodiment.

Characteristics of Protective Film:

It is desirable that the peeling strength (peeling force) of the protective film 20 of the present exemplary embodiment be at a level of enabling adhesion to the microscopic roughness structure 10, and the peeling strength is preferably 0.010 N/25 mm to 5.000 N/25 mm, more preferably 0.010 N/25 mm to 3.000 N/25 mm, and even more preferably 0.015 N/25 mm to 1.000 N/25 mm, with respect to the microscopic roughness structure 10. When the peeling strength is in the range described above, the protective film can adhere to the microscopic roughness structure 10 with sufficient strength, and when not needed, the protective film can be easily detached from the microscopic roughness structure.

Regarding the method for measuring the peeling strength of the protective film 20, the same as that described in the first exemplary embodiment applies.

<Method for Producing Protective Film-Attached Microscopic Roughness Structure>

The protective film-attached microscopic roughness structure of the present invention can be produced by affixing a protective film to the microscopic roughness structure.

(Production of Microscopic Roughness Structure)

Examples of the method for producing a microscopic roughness structure include the methods described below.

Method of performing injection molding or press molding using a mold in which a microscopically rough structure is formed on the surface (Method 1)

Method of disposing a resin composition between a mold and a transparent base material, curing the resin composition by irradiation of active energy radiation, thereby transferring the microscopically rough structure of the mold onto the cured product, and then detaching the mold from the cured product (Method 2)

Method of transferring the microscopically rough structure of a mold to a resin composition, subsequently detaching the mold from the resin composition, and curing the resin composition by irradiation of active energy radiation (Method 3)

Among these, from the viewpoints of transferability of the microscopically rough structure and the degree of freedom of the surface composition, Method 2 and Method 3 are preferred, and Method 2 is particularly preferred. The Method 2 is a method which is particularly suitable in the case of using a belt-shaped or roll-shaped mold that is capable of continuous production, and exhibits excellent productivity.

Examples of the method for forming a microscopically rough structure (reverse structure) on a mold include an electron beam lithography method and a laser light interferometry method. For example, a mold having a microscopically rough structure formed thereon can be obtained by applying an appropriate photoresist film on the surface of an appropriate supporting substrate, exposing the photoresist film with light such as ultraviolet laser light, an electron beam or X-radiation, and developing the photoresist film. Furthermore, a microscopically rough structure can also be formed directly on a supporting substrate itself by selectively etching a supporting substrate by dry etching through a photoresist layer, and removing the resist layer.

Furthermore, anodized porous alumina can be used as a mold. For example, a porous structure having a pore size of 20 nm to 200 nm, which is formed by anodizing aluminum at a predetermined voltage using oxalic acid, sulfuric acid, phosphoric acid or the like as a liquid electrolyte, may also be used as a mold. According to this method, pores with very high regularity can be formed in a self-organized manner by anodizing high purity aluminum for a long time at a positive voltage, subsequently first removing an oxide film, and anodizing the resultant again. Furthermore, as an anodization treatment and a pore size enlargement treatment are combined in the second anodization process, pores having a cross-section that is not rectangular but is triangular or bell-shaped can also be formed. Furthermore, the angles of the innermost parts of the pores can also be made sharper by appropriately regulating the time or conditions for the anodization treatment and the pore size enlargement treatment.

Furthermore, a duplicate mold may also be formed by an electroforming method from a mother mold having a microscopically rough structure.

The shape of the mold itself is not particularly limited, and the shape may be, for example, any of a flat plate shape, a belt shape and a roll shape. When the mold is in a belt shape or a roll shape, a microscopically rough structure can be continuously transferred, and therefore, productivity can be further increased.

Regarding the method of disposing a resin composition between a mold and a base material, a method of pressing the mold and the base material while a resin composition is disposed between the mold and the base material, and thereby injecting the rein composition into the microscopically rough structure of the mold, may be used.

When the microscopic roughness structure of the first exemplary embodiment described above is produced, the resin composition may be such that the water contact angle of the surface of the microscopic roughness structure is 40° or less.

On the other hand, when the microscopic roughness structure of the second exemplary embodiment described above is produced, the resin composition may be such that the ratio A1/A2 of the cured product is 0.1 to 0.8.

Furthermore, it is preferable that these resin compositions contain a monomer, an oligomer or a reactive polymer, all of which have a radical polymerizable bond and/or a cation polymerizable bond in the molecule, and the resin compositions may also contain a non-reactive polymer. Also, the resin composition usually contains a polymerization initiator for curing. Examples of the polymerization initiator include those known initiators.

Regarding the method of performing polymerization and curing by irradiating active energy radiation to the resin composition between a base material and a mold, a method based on the irradiation of ultraviolet radiation is preferred. Examples of the lamp for irradiating ultraviolet radiation include a high pressure mercury lamp, a metal halide lamp, and a fusion lamp.

The amount of irradiation of ultraviolet radiation may be determined according to the absorption wavelength or content of the polymerization initiator. Usually, the cumulative amount of light of ultraviolet radiation is preferably 400 mJ/cm$^2$ to 4000 mJ/cm$^2$, and more preferably 400 mJ/cm$^2$ to 2000 mJ/cm$^2$. When the cumulative amount of light is 400 mJ/cm$^2$ or greater, the resin composition is sufficiently cured, and thus a decrease in scratch resistance caused by insufficient curing can be suppressed. When the cumulative amount of light is 4000 mJ/cm$^2$ or less, it is significant from the viewpoint of suppressing coloration of the cured product or deterioration of the base material. The intensity of irradiation is preferably suppressed to a power output to the extent that deterioration of the base material or the like is not brought about.

After the polymerization and curing of the resin composition, the mold is detached from the cured product to obtain a cured product having a microscopically rough structure, and thereby a microscopic roughness structure is obtained.

Furthermore, when the base material is a three-dimensionally shaped laminate or the like, the microscopic roughness structure thus formed may be attached to a three-dimensionally shaped laminate that has been separately molded.

In a microscopic roughness structure obtainable as such, the microscopically rough structure of the mold is transferred to the surface of the base material in the manner simulating a key and a keyhole, so that the microscopic roughness structure has high scratch resistance, has water repellency in combination, and can exhibit excellent antireflective performance as a result of continuous change of the refractive index. Thus, the microscopic roughness structure is suitable as an antireflective film, or as a three-dimensionally shaped antireflective body.

(Affixation of Protective Film)

A protective film is affixed to the microscopic roughness structure obtained in this manner, such that the adhesive layer of the protective film and the surface on the microscopically rough structure side of the microscopic roughness structure are to be in contact, and thus a protective film-attached microscopic roughness structure is obtained. At that time, it is preferable to laminate the protective film on the microscopic roughness structure such that the protective film and the microscopic roughness structure closely adhere with a force to the extent that the protective film and the microscopic roughness structure can be detached later, and to apply pressure, so that the protective film would not be lifted or peeled off at the time of transport and processing.

Particularly, it is preferable that the microscopic roughness structure be produced, and subsequently, the protective film be pressed on the production line. For example, when the microscopic roughness structure and the protective film are passed between rubber rolls or the like in a state of being laminated, appropriate force is applied thereto, and thus a microscopic roughness structure having a protective film appropriate adhering thereto can be obtained. The pressure used at the time of affixing the protective film to the microscopic roughness structure is usually in the range of 0.1 MPa to 10 MPa.

Furthermore, when the adhesive layer of the protective film is hard, it is preferable to heat the adhesive layer before the protective film is attached to the microscopic roughness structure, so as to obtain a desired storage elastic modulus E', and to affix the protective film to the surface of the microscopic roughness structure.

When the adhesive layer is heated, it is not necessary to heat the entire area of attachment of the protective film, and the heating can be sufficiently dealt with by heating the rolls used for attachment to a desired temperature. The attachment of the protective film may be carried out by passing the assembly between a pair of rubber rolls, while a method of pressing the assembly against a flat plate-shaped wall or platform using one rubber roll may also be used. For example, the rubber roll used for the attachment is heated by a heating apparatus provided on the inner side of the rubber roll, and thus the temperature is set such that the rubber roll surface would be 40° C. to 60° C. When the microscopic roughness structure and the protective film are both conveyed and supplied to an attachment area at room temperature, the adhesive layer of the protective film is heated by rubber rolls, and thereby the adhesive layer acquires properties appropriate for attachment, the microscopic roughness structure and the protective film are bonded satisfactorily.

Heating by rubber rolls may be carried out using only the rubber roll that is brought into contact with the protective film. Particularly, it is preferable to affix the protective film to the surface of the microscopic roughness structure by heating the adhesive layer to adjust the storage elastic modulus E' to $6 \times 10^6$ Pa or less. When the protective film is affixed to the surface of the microscopic roughness structure at the time when the storage elastic modulus E' of the adhesive layer is $6 \times 10^6$ Pa or less, the surface of the microscopic roughness structure is more likely to be appropriately encroached by the adhesive layer of the protective film, and therefore, the protective film and the microscopic roughness structure can be attached more easily with satisfactory adhesiveness.

<Operating Effect>

In the protective film-attached microscopic roughness structure of the first exemplary embodiment described above, since the water contact angle of the surface of the microscopic roughness structure is 40° or less, the protective film adheres satisfactorily to the microscopic roughness structure and is not peeled off carelessly.

Furthermore, since the compressive stress of the adhesive layer of the protective film is 0.6 MPa to 3.0 MPa, the adhesive layer has appropriate cohesive force, and after the protective film is peeled off, adhesive residue does not easily occur on the microscopically rough structure.

Furthermore, in the protective film-attached microscopic roughness structure of the second exemplary embodiment described above, since the ratio A1/A2 of the surface on the microscopically rough structure side of the microscopic roughness structure is 0.1 to 0.8, the protective film adheres satisfactorily to the microscopic roughness structure and is not peeled off carelessly. Furthermore, since the ratio B1/B2 of the surface of the adhesive layer of the protective film is 0.6 to 1.3, the adhesive layer has appropriate cohesive force, and after the protective film is peeled off, adhesive residue does not easily occur on the microscopically rough structure.

Furthermore, in the protective film-attached microscopic roughness structures of the first exemplary embodiment and the second exemplary embodiment, since the surface of the microscopic roughness structure is protected by the protective film, damaging of the microscopically rough structure at the time of shipping, transport and storage can be prevented.

Also, in the protective film-attached microscopic roughness structures of the first exemplary embodiment and the second exemplary embodiment, since less adhesive residue remains on the microscopically rough structure after the protective film is peeled off, a microscopic roughness structure can be provided in a state of maintaining the antireflective performance at a high level.

In addition, if the adhesive layer and the film base material that constitute the protective film have excellent transparency, the condition of the microscopically rough structure would be possibly inspected through the protective film, without peeling off the protective film. Examples of the inspection of the condition of the microscopically rough structure include measurement of quantitative optical characteristics such as the total light transmittance, haze value, and reflectance; detection of the presence or absence of product defects.

Examples

Hereinafter, the present invention will be described specifically by way of Examples, but the present invention is not intended to be limited to these.

Meanwhile, in the following descriptions, unless particularly stated otherwise, the unit "parts" means "parts by mass".

(Various Methods for Measurement and Evaluation)

(1) Measurement of Pores in Mold:

Platinum was vapor deposited for one minute on a portion of a longitudinal cross-section of a mold formed of anodized porous alumina, and the cross-section was observed using a field emission type scanning electron microscope (manufactured by JEOL, Ltd., JSM-7400F) at an accelerating voltage of 3.00 kV. Thus, the intervals (periods) of adjoining pores and the depths of pores were measured. Specifically, measurement was made respectively at 10 sites, and the average value thereof was defined as the measurement value.

(2) Measurement of Convexity of Microscopic Roughness Structure:

Platinum was vapor deposited for 10 minutes on a longitudinal cross-section of a microscopic roughness structure, and using the same apparatus and conditions as in the case of (1), the intervals (periods) of adjoining convexities and the heights of convexities were measured. Specifically, measurement was made respectively at 10 sites, and the average value thereof was defined as the measurement value.

(3) Measurement of Water Contact Angle:

5 µL of ion-exchanged water was dropped on the surface on the microscopically rough structure side of a microscopic roughness structure (surface of the microscopic roughness structure), and the water contact angle of the surface of the microscopic roughness structure was calculated by the θ/2 method, using an automatic contact angle meter (manufactured by Kruss GmbH).

(4) Infrared Absorption Spectrum:

The infrared absorption spectrum of the surface on the microscopically rough structure side of the microscopic roughness structure or the surface of the adhesive layer was measured by an ATR method using FT-IR AVATAR 330 of Nicolet Corp., under the conditions of a measurement wave number of 4000 cm$^{-1}$ to 700 cm$^{-1}$, a resolution of 4 cm$^{-1}$, and a cumulative number of 64 times. For the sample, a sample that had been left to stand for one whole day and night or longer in a chamber adjusted to a temperature of 23° C. and a relative humidity of 50% was used.

From the infrared absorption spectrum thus obtained, the ratio of the peak area of C=O stretching vibration ($S_{C=O}$) and the peak area of OH stretching vibration ($S_{OH}$) ($S_{OH}/S_{C=O}$) of an ester bond was determined using, for example, the peak area tool of OMNIC E.S.P. Software Package. The peak area of the C=O stretching vibration of an ester bond was defined as the area of an absorption curve having the absorption maximum in the region of 1730±10 cm$^{-1}$, and the peak area of the OH stretching vibration was defined as the area of an absorption curve having the absorption maximum in the region of 3700 cm$^{-1}$ to 3100 cm$^{-1}$. The baseline was defined as the line that connects the bases on both sides of each absorption curve, or the valleys between different absorption curves.

(5) Measurement of Reflectance:

The surface of a microscopic roughness structure on the opposite side of the microscopically rough structure side (back surface of the microscopic roughness structure) was roughened with a sand paper (GRIT No. 500), and then was painted black to prepare a sample. For this sample, the relative reflectance in the wavelength range of 380 nm to 780 nm was measured under the conditions of an incident angle of 5°, using a spectrophotometer (manufactured by Hitachi, Ltd., U-4100).

(6) Measurement of Compressive Stress:

A film having a thickness of about 2 mm was molded using the adhesive composition that constitutes the adhesive layer, and this film was punched into a plate shape which measured 1 cm on each side. This was used as a specimen. The specimen thus obtained was compressed using a compression testing machine to a compression ratio of 20% in the thickness direction at a rate of 0.1 mm/min, and the compressive stress at a compression ratio of 20% was measured.

(7) Measurement of Storage Elastic Modulus E':

A film having a thickness of 500 µm was molded using the adhesive composition that constitutes the adhesive layer, and this film was punched into a strip shape having a width of 5 mm. This was used as a specimen. The specimen thus obtained was analyzed using a viscoelasticity analyzer (Seiko Instruments, Inc., DMS 110) in a tensile mode at a distance between chucks of 2 cm under the conditions of temperature increase from −50° C. to 100° C. at 1 Hz at a rate of 2° C./min. Thus, the storage elastic modulus E' was determined.

(8) Evaluation of Adhesiveness:

(8-1) Evaluation of Adhesiveness 1

A specimen obtained by heating a protective film to 40° C. and then immediately attaching the protective film to a microscopic roughness structure, was cut with a straw cutter type cutting machine, and the condition of the specimen was observed by visual inspection. If the protective film was not peeled off from the microscopic roughness structure, the specimen was considered to have satisfactory adhesiveness and was rated as "○"; and if the protective film was peeled off, the specimen was considered to have poor adhesiveness and was rated as "X".

(8-2) Evaluation of Adhesiveness 2

The protective film-attached microscopic roughness structure thus obtained was cut with a straw cutter type cutting machine, and the condition of the specimen was observed by visual inspection. If the protective film was not peeled off from the microscopic roughness structure, the specimen was considered to have satisfactory adhesiveness and was rated as "○"; and if the protective film was peeled off, the specimen was considered to have poor adhesiveness and was rated as "X".

(9) Evaluation of Adhesive Residue (9-1) Evaluation of Adhesive Residue 1

A specimen obtained by heating a protective film to 40° C., and then immediately attaching the protective film to a microscopic roughness structure, was stored for 2 weeks in an environment at 23° C. and a relative humidity of 50%. Thereafter, the protective film was detached, and the reflectance of the microscopic roughness structure was measured in the same manner as in (5).

For the wavelengths of 400 nm, 550 nm and 700 nm, the differences between the reflectances of the microscopic roughness structure before the affixation of the protective film, and the reflectances of the microscopic roughness structure after the passage of two weeks in the state in which the protective film was affixed, were determined, and the average values were calculated. The degree of adhesive residue was evaluated based on the following evaluation criteria.

A: The average value of the difference is ±0.02%.

B: The average value of the difference is greater than ±0.02% and less than or equal to ±0.06%.

C: The average value of the difference is greater than ±0.06%. Alternatively, the curve of the reflectance is changing.

(9-2) Evaluation of Adhesive Residue 2

The protective film-attached microscopic roughness structure thus obtained was stored for two weeks in an environment at 23° C. and a relative humidity of 50%. Thereafter, the protective film was detached, and the reflectance of the microscopic roughness structure was measured in the same manner as in (5).

For the wavelengths of 400 nm, 550 nm and 700 nm, the differences between the reflectances of the microscopic roughness structure before the affixation of the protective film, and the reflectances of the microscopic roughness structure after the passage of two weeks in the state in which the protective film was affixed, were determined, and the average values were calculated. The degree of adhesive residue was evaluated based on the following evaluation criteria.

A: The average value of the difference is ±0.02%.

B: The average value of the difference is greater than ±0.02% and less than or equal to ±0.06%.

C: The average value of the difference is greater than ±0.06%. Alternatively, the curve of the reflectance is changing.

(Production of Mold)

Figure 6:
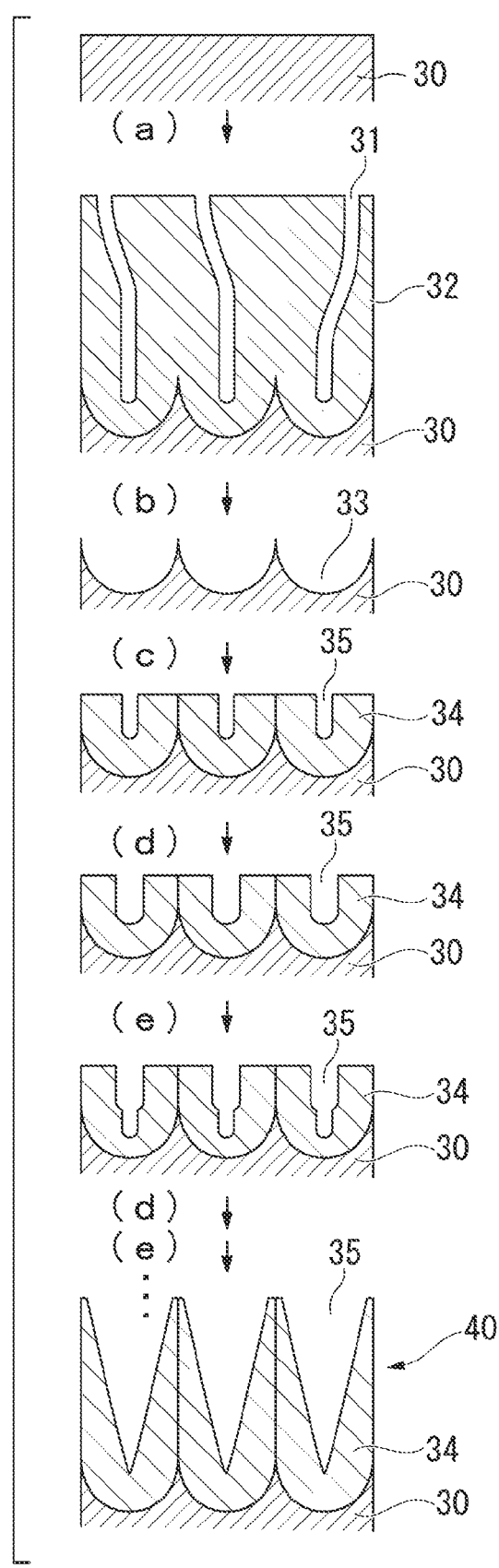
FIG. 6 is a cross-sectional diagram illustrating the production process for a mold having anodized alumina on the surface.

According to the process illustrated in FIG. 6, a mold (depth of pores: 180 nm) was produced as follows.

First, an aluminum plate 30 having a purity of 99.99% was subjected to fabric polishing, and then to electrolytic polishing in a perchloric acid/ethanol mixed solution (volume ratio of ¼) to have mirror-like surfaces.

Process (a):

The aluminum plate 30 was subjected to anodization for 30 minutes in a 0.3 M aqueous solution of oxalic acid under the conditions of a direct current of 40 V and a temperature of 16° C., and thus pores 31 were generated in an oxide film 32.

Process (b):

The aluminum plate 30 having the oxide film 32 formed thereon was immersed in a mixed aqueous solution of 6 mass % phosphoric acid/1.8 mass % chromic acid for 6 hours to remove the oxide film 32, and periodic depressions 33 corresponding to pores 31 were exposed.

Process (c):

The aluminum plate 30 in which the depressions 33 were exposed was subjected to anodization for 30 seconds in a 0.3 M aqueous solution of oxalic acid under the conditions of a direct current of 40 V and a temperature of 16° C., and thus an oxide film 34 having pores 35 was formed.

Process (d):

The aluminum plate having the oxide film 34 formed thereon was immersed in 5 mass % phosphoric acid at 32° C. for 8 minutes, and thereby a pore size enlargement treatment for the pores 35 was carried out.

Process (e):

The aluminum plate 30 that had been subjected to a pore size enlargement treatment was subjected to anodization for 30 seconds in a 0.3 M aqueous solution of oxalic acid under the conditions of a direct current of 40 V and a temperature of 16° C., and thus small-sized pores 35 extending downward from the pores 35 were formed.

Process (f):

The process (d) and the process (e) were repeated four times in total, and the process (e) was carried out at the end. Thus, an anodized porous alumina having approximately conically shaped pores 35 having an average interval (period) of 100 nm and a depth of 180 nm was obtained.

The anodized porous alumina thus obtained was washed with deionized water, and the water present at the surface was removed by air blowing. The anodized porous alumina was immersed for 10 minutes in a solution containing a surface antifouling coating agent (manufactured by Daikin Industries, Ltd., OPTOOL DSX), which had been diluted with a diluent (manufactured by Harves Co., Ltd., HD-ZV) to obtain a solid content of 0.1 mass %, and dried in air for 20 hours. Thus, a mold 40 was obtained.

(Production of Microscopic Roughness Structure (1-1))

Preparation of Active Energy Ray-Curable Resin Composition (1-1):

20 parts of A-DPH manufactured by Shin Nakamura Chemical Co., Ltd., 20 parts of NEW FRONTIER PET-3 manufactured by Daiichi Kogyo Seiyaku Co., Ltd., 35 parts of polyethylene glycol diacrylate (manufactured by Shin Nakamura Chemical Co., Ltd., NK ESTER A-200), 25 parts of hydroxyethyl acrylate, 1.0 part of IRGACURE 184 and 0.5 parts of IRGACURE 819, both manufactured by Ciba Geigy Japan, Ltd. as active energy ray polymerization initiators, were mixed and uniformly dissolved. Thus, an active energy ray-curable resin composition (1-1) was prepared.

Production of Microscopic Roughness Structure (1-1):

The temperature of the active energy ray-curable resin composition (1-1) was adjusted to 50° C., and the active energy ray-curable resin composition was poured onto the pore-formed surface of the mold regulated to 50° C. A polyethylene terephthalate film (manufactured by Mitsubishi Plastics, Inc., WE97A) having a thickness of 38 μm was coated thereon by spreading while pressing. Thereafter, the mold was irradiated with ultraviolet radiation through the film side using a fusion lamp at a belt speed of 6.0 m/min and in a cumulative amount of light of 1000 mJ/cm$^2$, and thereby the active energy ray-curable resin composition (1-1) was cured. Next, the mold was detached from the film, and thus a microscopic roughness structure (1-1) was obtained.

On the surface of the microscopic roughness structure (1-1) thus obtained, the microscopically rough structure of the mold was transferred, and as illustrated in FIG. 2, there was formed an approximately conically shaped, microscopically rough structure in which the average interval (period) $W_1$ of adjoining convexities 13 was 100 nm, and the average height $d_1$ of the convexities was 180 nm. The results of the water contact angle, the ratio A1/A2, and the reflectance are presented in Table 1.

(Production of Microscopic Roughness Structure (1-2))

Preparation of Active Energy Ray-Curable Resin Composition (1-2):

70 parts of a mixture obtained by allowing trimethylolethane/succinic acid/acrylic acid to react at a molar ratio of 2/1/4, 20 parts of polyethylene glycol diacrylate (manufactured by Shin Nakamura Chemical Co., Ltd., NK ESTER A-600), 3 parts of hydroxyethyl acrylate, 7 parts of methyl acrylate, 1.0 part of IRGACURE 184 and 0.1 parts of IRGACURE 819, both manufactured by Ciba Geigy Japan, Ltd. as active energy ray polymerization initiators, were mixed and uniformly dissolved. Thus, an active energy ray-curable resin composition (1-2) was prepared.

Production of Microscopic Roughness Structure (1-2):

A microscopic roughness structure (1-2) was produced by the same method as the method for producing the microscopic roughness structure (1-1), except that the active energy ray-curable resin composition (1-2) was used.

On the surface of the microscopic roughness structure (1-2) thus obtained, the microscopically rough structure of the mold was transferred, and as illustrated in FIG. 2, there was formed an approximately conically shaped, microscopically rough structure in which the average interval (period) $W_1$ of adjoining convexities 13 was 100 nm, and the average height $d_1$ of the convexities was 180 nm. The results of the water contact angle, the ratio A1/A2, and the reflectance are presented in Table 1.

(Production of Microscopic Roughness Structure (2-1))

Preparation of Active Energy Ray-Curable Resin Composition (2-1):

20 parts of dipentaerythritol hexaacrylate (manufactured by Daiichi Kogyo Seiyaku Co., Ltd., NEW FRONTIER A-DPH), 20 parts of pentaerythritol triacrylate (manufactured by Daiichi Kogyo Seiyaku Co., Ltd., NEW FRONTIER PET-3), 35 parts of polyethylene glycol diacrylate (manufactured by Shin Nakamura Chemical Co., Ltd., NK ESTER A-200), 25 parts of hydroxyethyl acrylate, 1.0 parts of IRGACURE 184 and 0.5 parts of IRGACURE 819, both manufactured by Ciba Geigy Japan, Ltd. as active energy ray polymerization initiators, were mixed and uniformly dissolved. Thus, an active energy ray-curable resin composition (2-1) was prepared.

Production of Microscopic Roughness Structure (2-1):

The temperature of the active energy ray-curable resin composition (2-1) was adjusted to 50° C., and the active energy ray-curable resin composition was poured onto the pore-formed surface of the mold regulated to 50° C. A triacetyl cellulose film (manufactured by Mitsubishi Plastics, Inc., WE97A) having a thickness of 40 µm was coated thereon by spreading while pressing. Thereafter, the mold was irradiated with ultraviolet radiation through the film side using a fusion lamp at a belt speed of 6.0 m/min and in a cumulative amount of light of 1000 mJ/cm$^2$, and thereby the active energy ray-curable resin composition (2-1) was cured. Next, the mold was detached from the film, and thus a microscopic roughness structure (2-1) was obtained.

On the surface of the microscopic roughness structure (2-1) thus obtained, the microscopically rough structure of the mold was transferred, and as illustrated in FIG. 2, there was formed an approximately conically shaped, microscopically rough structure in which the average interval (period) $W_1$ of adjoining convexities 13 was 100 nm, and the average height $d_1$ of the convexities was 180 nm. The results of the water contact angle, the ratio A1/A2, and the reflectance are presented in Table 1.

(Production of Microscopic Roughness Structure (2-2))

Preparation of Active Energy Ray-Curable Resin Composition (2-2):

20 parts of dipentaerythritol hexaacrylate (manufactured by Daiichi Kogyo Seiyaku Co., Ltd., NEW FRONTIER A-DPH), 25 parts of pentaerythritol triacrylate (manufactured by Daiichi Kogyo Seiyaku Co., Ltd., NEW FRONTIER PET-3), 25 parts of ethoxylated dipentaerythritol hexaacrylate (manufactured by Daiichi Kogyo Seiyaku Co., Ltd., NEW FRONTIER DPEA-12), 25 parts of polyethylene glycol diacrylate (manufactured by Shin Nakamura Chemical Co., Ltd., NK ESTER A-600), 5 parts of methyl acrylate, 1.0 part of IRGACURE 184 and 0.1 parts of IRGACURE 819, both manufactured by Ciba Geigy Japan, Ltd. as active energy ray polymerization initiators, were mixed and uniformly dissolved. Thus, an active energy ray-curable resin composition (2-2) was prepared.

Production of Microscopic Roughness Structure (2-2):

A microscopic roughness structure (2-2) was produced by the same method as the method for producing the microscopic roughness structure (2-1), except that the active energy ray-curable resin composition (2-2) was used, and an acrylic film (manufactured by Mitsubishi Rayon Co., Ltd. ACRYPRENE HBS010) having a thickness of 38 µm was used as the base material.

On the surface of the microscopic roughness structure (2-2) thus obtained, the microscopically rough structure of the mold was transferred, and as illustrated in FIG. 2, there was formed an approximately conically shaped, microscopically rough structure in which the average interval (period) $W_1$ of adjoining convexities 13 was 100 nm, and the average height $d_1$ of the convexities was 180 nm. The results of the water contact angle, the ratio A1/A2, and the reflectance are presented in Table 1.

(Production of Microscopic Roughness Structure (2-3))

Preparation of Active Energy Ray-Curable Resin Composition (2-3):

70 parts of a mixture obtained by allowing trimethylolethane/succinic acid/acrylic acid to react at a molar ratio of 2/1/4, 20 parts of polyethylene glycol diacrylate (manufactured by Shin Nakamura Chemical Co., Ltd., NK ESTER A-600), 3 parts of hydroxyethyl acrylate, 7 parts of methyl acrylate, 1.0 part of IRGACURE 184 and 0.1 parts of IRGACURE 819, both manufactured by Ciba Geigy Japan, Ltd. as active energy ray polymerization initiators, were mixed and uniformly dissolved. Thus, an active energy ray-curable resin composition (2-3) was prepared.

Production of Microscopic Roughness Structure (2-3):

A microscopic roughness structure (2-3) was produced by the same method as the method for producing the microscopic roughness structure (2-1), except that the active energy ray-curable resin composition (2-3) was used, and an acrylic film (manufactured by Mitsubishi Rayon Co., Ltd., ACRYPRENE HBS010) having a thickness of 38 µm was used as the base material.

On the surface of the microscopic roughness structure (2-3) thus obtained, the microscopically rough structure of the mold was transferred, and as illustrated in FIG. 2, there was formed an approximately conically shaped, microscopically rough structure in which the average interval (period) $W_1$ of adjoining convexities 13 was 100 nm, and the average height $d_1$ of the convexities was 180 nm. The results of the water contact angle, the ratio A1/A2, and the reflectance are presented in Table 1.

(Production of Microscopic Roughness Structure (2-4))

Preparation of Active Energy Ray-Curable Resin Composition (2-4):

45 parts of a mixture obtained by allowing trimethylolethane/succinic acid/acrylic acid to react at a molar ratio of 2/1/4, 45 parts of 1,6-hexanediol diacrylate, 10 parts of silicone diacrylate (manufactured by Shin-Etsu Silicone, Ltd., x-22-1602), 1.0 part of IRGACURE 184 and 0.1 parts of IRGACURE 819, both manufactured by Ciba Geigy Japan, Ltd. as active energy ray polymerization initiators, were mixed and uniformly dissolved. Thus, an active energy ray-curable resin composition (2-4) was prepared.

(Production of Microscopic Roughness Structure (2-4):

A microscopic roughness structure (2-4) was produced by the same method as the method for producing the microscopic roughness structure (2-1), except that the active energy ray-curable resin composition (2-4) was used, and a polyethylene terephthalate film (manufactured by Mitsubishi Plastics, Inc., WE97A) having a thickness of 38 μm was used as the base material.

On the surface of the microscopic roughness structure (2-4) thus obtained, the microscopically rough structure of the mold was transferred, and as illustrated in FIG. 2, there was formed an approximately conically shaped, microscopically rough structure in which the average interval (period) $W_1$ of adjoining convexities 13 was 100 nm, and the average height $d_1$ of the convexities was 180 nm. The results of the water contact angle, the ratio A1/A2, and the reflectance are presented in Table 1.

(Production of Microscopic Roughness Structure (2-5))

Preparation of Active Energy Ray-Curable Resin Composition (2-5):

20 parts of urethane acrylate (manufactured by Daicel-Cytec Co., Ltd., EBECRYL 8402), 80 parts of cyclohexanedimethanol monoacrylate (manufactured by Nippon Kasei Chemical Co., Ltd.), 1.0 part of IRGACURE 184 and 0.1 parts of IRGACURE 819, both manufactured by Ciba Geigy Japan, Ltd. as active energy ray polymerization initiators, were mixed and uniformly dissolved. Thus, an active energy ray-curable resin composition (2-5) was prepared.

Production of Microscopic Roughness Structure (2-5):

A microscopic roughness structure (2-5) was produced by the same method as the method for producing the microscopic roughness structure (2-1), except that the active energy ray-curable resin composition (2-5) was used, and a polyethylene terephthalate (hereinafter, described as PET) film (manufactured by Mitsubishi Plastics, Inc., WE97A) having a thickness of 38 μm was used as the base material.

The microscopic roughness structure (2-5) thus obtained was transparent and had excellent antireflective performance immediately after being detached from the mold, similarly to other microscopic roughness structures, but after several minutes passed from the detachment, white fogging gradually occurred. The microscopically rough structure of the mold was transferred, and fine convexities stood up in a large amount at the surface of the cured product. However, in the microscopic roughness structure (2-5), since functional groups capable of forming hydrogen bonding, such as a hydroxyl group and an amino group, were present in a large amount at the surface of the cured product, the interaction between the convexities was strong, and the microscopic roughness structure acquired a size in which the convexities came closer to each other and scatteringly reflected light. The results of the ratio A1/A2 and the reflectance are presented in Table 1.

TABLE 1

| | Water contact angle (°) | Peak area ratio A1/A2 | Reflectance (%) 400 nm | 550 nm | 700 nm |
|---|---|---|---|---|---|
| Microscopic roughness structure (1-1) | 17 | 0.66 | 0.08 | 0.11 | 0.16 |
| Microscopic roughness structure (1-2) | 13 | 0.11 | 0.04 | 0.08 | 0.12 |
| Microscopic roughness structure (2-1) | 17 | 0.66 | 0.08 | 0.11 | 0.16 |
| Microscopic roughness structure (2-2) | 13 | 0.34 | 0.12 | 0.14 | 0.15 |

TABLE 1-continued

| | Water contact angle (°) | Peak area ratio A1/A2 | Reflectance (%) 400 nm | 550 nm | 700 nm |
|---|---|---|---|---|---|
| Microscopic roughness structure (2-3) | 13 | 0.11 | 0.04 | 0.08 | 0.12 |
| Microscopic roughness structure (2-4) | 135 | 0.07 | 0.19 | 0.14 | 0.24 |
| Microscopic roughness structure (2-5) | — | 0.86 | 2.96 | 3.57 | 3.82 |

Example 1-1

Production of Protective Film

An easily adhesive layer-attached PET film (manufactured Toyobo Co., Ltd., A4300, thickness: 38 μm) was used as a film base material.

A photopolymerizable adhesive composition was prepared using the mixing composition indicated in Table 2. The adhesive composition thus obtained was applied on the surface of the film base material, a polyethylene film was covered thereon, and the polyethylene film was spread with a roller so as to make the thickness uniform.

Active energy radiation was irradiated using a fusion UV lamp (D valve) (manufactured by Fusion UV Systems Japan K.K. such that the cumulative amount of light would be approximately 1000 mJ/cm$^2$, and thus a protective film on which an adhesive layer (thickness: about 3 μm to 5 μm) formed from a cured product of an adhesive composition was formed on the surface of the film base material, was obtained. The compressive stress, the ratio B1/B2, and the storage elastic modulus E' are presented in Table 2.

(Production of Protective Film-Attached Microscopic Roughness Structure)

The microscopic roughness structure (1-1) and the protective film were respectively cut into a strip form having a width of 5 cm, and were attached using a rubber roller having a weight of 2 kg such that the adhesive layer of the protective film would be affixed to the surface on the microscopically rough structure side of the microscopic roughness structure (1-1).

Separately, specimens for the evaluation of adhesiveness and adhesive residue were produced based on (8-1) Evaluation of adhesiveness 1 and (9-1) Evaluation of adhesive residue 1, and evaluation of adhesiveness and adhesive residue was carried out. The results are presented in Table 2.

Examples 1-2 to 1-5 and Comparative Examples 1-1 to 1-7

Protective film-attached microscopic roughness structures were produced in the same manner as in Example 1-1, except that adhesive compositions were prepared using the mixing compositions indicated in Tables 2 to 4, and the adhesive compositions thus obtained and the microscopic roughness structures of the kinds indicated in Tables 2 to 4 were used, and various evaluations were carried out. The results are presented in Tables 2 to 4.

Example 2-1

Protection of Protective Film

An easily adhesive layer-attached PET film (manufactured by Toyobo Co., Ltd., A4300, thickness; 38 µm) was used as the film base material.

A photopolymerizable adhesive composition was prepared using the mixing composition indicated in Table 5. The adhesive composition thus obtained was applied on the surface of the film base material, a polyethylene film was covered thereon, and the polyethylene film was spread with a roller so as to make the thickness uniform.

Active energy radiation was irradiated using a fusion UV lamp (D valve) (manufactured by Fusion UV Systems Japan K.K. such that the cumulative amount of light would be approximately 1000 mJ/cm$^2$, and thus a protective film on which an adhesive layer (thickness: about 3 µm to 5 µm) formed from a cured product of an adhesive composition was formed on the surface of the film base material, was obtained. The compressive stress, the ratio B1/B2, and the storage elastic modulus E' are presented in Table 5.

(Production of Protective Film-Attached Microscopic Roughness Structure)

The microscopic roughness structure (2-1) and the protective film were respectively cut into a strip form having a width of 5 cm, and were attached using a rubber roller having a weight of 2 kg such that the adhesive layer of the protective film would be affixed to the surface on the microscopically rough structure side of the microscopic roughness structure (2-1). Evaluation of adhesiveness and adhesive residue was carried out based on (8-2) Evaluation of adhesiveness 2 and (9-2) Evaluation of adhesive residue 2. The results are presented in Table 5.

Comparative Example 2-1

Production of Protective Film-Attached Microscopic Roughness Structure

The microscopic roughness structure (2-1) and an acrylic protective film (manufactured by Hitachi Chemical Co., Ltd., HITALEX DP-1010) were respectively cut into a strip form having a width of 5 cm, and an attempt was made to attach the microscopic roughness structure and the acrylic protective film using a rubber roller having a weight of 2 kg such that the adhesive layer of the protective film would be affixed to the surface on the microscopically rough structure side of the microscopic roughness structure (2-1). However, adhesiveness was poor, and a protective film-attached microscopic roughness structure could not be obtained. The ratio B1/B2 is presented in Table 7.

Comparative Example 2-2

Production of Protective Film-Attached Microscopic Roughness Structure

The microscopic roughness structure (2-1) and an acrylic protective film (manufactured by Sun A. Kaken Co., Ltd., SAT HC1138T5-J) were respectively cut into a strip form having a width of 5 cm, and an attempt was made to attach the microscopic roughness structure and the acrylic protective film using a rubber roller having a weight of 2 kg such that the adhesive layer of the protective film would be affixed to the surface on the microscopically rough structure side of the microscopic roughness structure (2-1). However, adhesiveness was poor, and a protective film-attached microscopic roughness structure could not be obtained. The ratio B1/B2 is presented in Table 7.

Examples 2-2 to 2-7 and Comparative Examples 2-3 to 2-10

Figure 7:
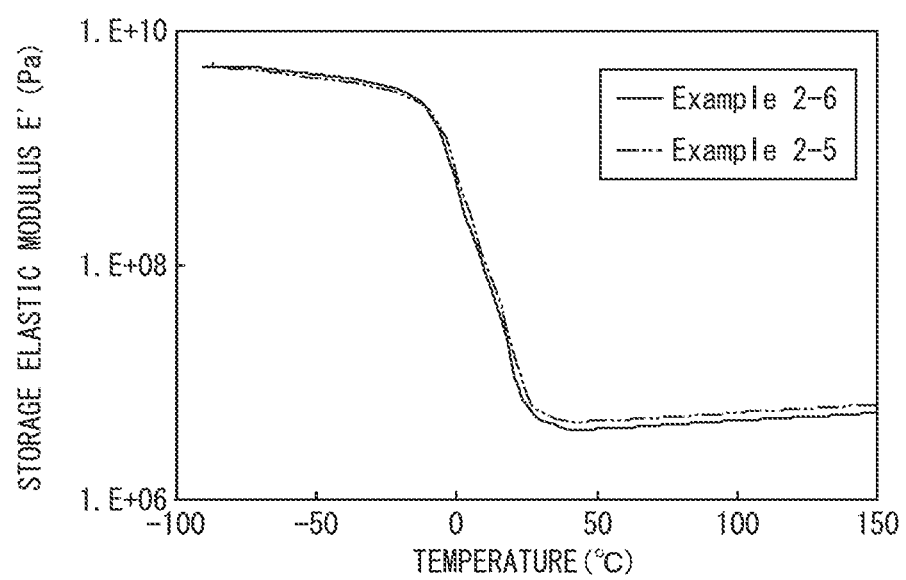
FIG. 7 is a graph of the storage elastic modulus E' of the adhesive layers obtained in Examples 2-5 and 2-6.

Protective film-attached microscopic roughness structures were produced in the same manner as in Example 2-1, except that adhesive compositions were prepared using the mixing compositions indicated in Tables 5 to 8, and the adhesive compositions thus obtained and microscopic roughness structures of the kinds indicated in Table 5 to 8 were used, and various evaluations were carried out. The results are presented in Tables 5 to 8. Furthermore, a graph of the storage elastic modulus E' of the adhesive layers in Examples 2-5 and 2-6 is shown in FIG. 7.

TABLE 2

|  |  | Example 1-1 | Example 1-2 | Example 1-3 | Example 1-4 | Example 1-5 |
|---|---|---|---|---|---|---|
| Kind of microscopic roughness structure | | (1-1) | (1-1) | (1-2) | (1-1) | (1-1) |
| Mixing composition of adhesive composition (parts by mass) | EB8402 | 30 | 20 | 10 | 50 | 20 |
| | CHDMMA | 0 | 0 | 80 | 0 | 80 |
| | HPA | 50 | 65 | 0 | 20 | 0 |
| | AP400 | 0 | 0 | 10 | 0 | 0 |
| | IOA | 20 | 15 | 0 | 30 | 0 |
| | DAR TPO | 0.5 | 0.5 | 0.5 | 0.5 | 0.5 |
| Adhesive layer | 20% Compressive stress (MPa) | 2.55 | 1.59 | 0.65 | 2.87 | 1.53 |
| | Peak area ratio B1/B2 | 0.7 | 0.91 | 0.76 | 0.31 | 0.86 |
| | Storage elastic modulus E' | Temperature (° C.) | 25 | 25 | 35 | 25 | 45 |
| | | E' (Pa) | $4.2 \times 10^6$ | $3.6 \times 10^6$ | $2.5 \times 10^6$ | $9.5 \times 10^6$ | $4.6 \times 10^6$ |
| | Storage elastic modulus E' of rubbery plateau (Pa) | $3.8 \times 10^6$ | $3.3 \times 10^6$ | $1.8 \times 10^6$ | $9.3 \times 10^6$ | $3.2 \times 10^6$ |
| Evaluation of adhesiveness | | ◯ | ◯ | ◯ | Δ | ◯ |
| Adhesive residue | Reflectance (%) | 400 nm | 0.08 | 0.08 | 0.09 | 0.07 | 0.10 |
| | | 550 nm | 0.11 | 0.11 | 0.13 | 0.11 | 0.13 |
| | | 700 nm | 0.17 | 0.14 | 0.19 | 0.16 | 0.19 |
| | Average value of differences | 0.003 | 0.007 | 0.057 | 0.003 | 0.023 |
| | Evaluation | A | A | B | A | B |

TABLE 3

|  |  | Comparative Example 1-1 | Comparative Example 1-2 | Comparative Example 1-3 | Comparative Example 1-4 | Comparative Example 1-5 |
|---|---|---|---|---|---|---|
| Kind of microscopic roughness structure | | (1-1) | (1-1) | (1-1) | (1-2) | (1-2) |
| Mixing composition of adhesive composition (parts by mass) | EB8402 | 10 | 10 | 5 | 0 | 5 |
| | CHDMMA | 0 | 65 | 75 | 60 | 55 |
| | HPA | 80 | 0 | 0 | 0 | 0 |
| | AP400 | 0 | 25 | 20 | 40 | 40 |
| | IOA | 10 | 0 | 0 | 0 | 0 |
| | DAR TPO | 0.5 | 0.5 | 0.5 | 0.5 | 0.5 |
| Adhesive layer | 20% Compressive stress (MPa) | 0.41 | 0.59 | 0.53 | Not measurable | 0.56 |
| | Peak area ratio B1/B2 | 1.34 | 0.87 | 0.97 | 1 | 0.92 |
| | Storage elastic modulus | Temperature (° C.) | Not measurable | 25 | Not measurable | Not measurable | Not measurable |
| | | E' (Pa) | | $2.0 \times 10^6$ | | | |
| | Storage elastic modulus E' of rubbery plateau (Pa) | | $1.4 \times 10^6$ | | | |
| Evaluation of adhesiveness | | ○ | ○ | ○ | ○ | ○ |
| Adhesive residue | Reflectance (%) | 400 nm | 0.15 | 0.19 | 0.24 | Not evaluated | 0.50 |
| | | 550 nm | 0.13 | 0.16 | 0.21 | | 0.32 |
| | | 700 nm | 0.26 | 0.33 | 0.37 | | 0.53 |
| | Average value of differences | 0.063 | 0.110 | 0.157 | | 0.370 |
| | Evaluation | C | C | C | | C |

TABLE 4

|  |  | Comparative Example 1-6 | Comparative Example 1-7 |
|---|---|---|---|
| Kind of microscopic roughness structure | | (1-2) | (1-1) |
| Mixing composition of adhesive composition (parts by mass) | EB8402 | 10 | 50 |
| | CHDMMA | 10 | 50 |
| | HPA | 0 | 0 |
| | AP400 | 80 | 0 |
| | IOA | 0 | 0 |
| | DAR TPO | 0.5 | 0.5 |
| Adhesive layer | 20% Compressive stress (MPa) | 0.54 | 3.1 |
| | Peak area ratio B1/B2 | 0.61 | 0.5 |
| | Storage elastic modulus | Temperature (° C.) | Not measurable | 60 |
| | | E' (Pa) | | $10.5 \times 10^6$ |
| | Storage elastic modulus E' of rubbery plateau (Pa) | | $10.4 \times 10^6$ |
| Evaluation of adhesiveness | | ○ | X |
| Adhesive residue | Reflectance (%) | 400 nm | 0.39 | Not evaluated |
| | | 550 nm | 0.27 | |
| | | 700 nm | 0.51 | |
| | Average value of differences | 0.310 | |
| | Evaluation | C | |

TABLE 5

|  |  | Example 2-1 | Example 2-2 | Example 2-3 | Example 2-4 | Example 2-5 |
|---|---|---|---|---|---|---|
| Kind of microscopic roughness structure | | (2-1) | (2-1) | (2-1) | (2-2) | (2-2) |
| Mixing composition of adhesive composition (parts by mass) | EB8402 | 30 | 20 | 20 | 30 | 30 |
| | CHDMMA | 0 | 0 | 80 | 0 | 0 |
| | HPA | 50 | 65 | 0 | 50 | 70 |
| | AP400 | 0 | 0 | 0 | 0 | 0 |
| | IOA | 20 | 15 | 0 | 20 | 0 |
| | DAR TPO | 0.5 | 0.5 | 0.5 | 0.5 | 0.5 |
| Adhesive layer | 20% Compressive stress (MPa) | 2.55 | 1.59 | 1.53 | 2.55 | 0.97 |
| | Peak area ratio B1/B2 | 0.7 | 0.91 | 0.86 | 0.7 | 0.96 |
| | Storage elastic modulus | Temperature (° C.) | 25 | 25 | 45 | 25 | 35 |
| | | E' (Pa) | $4.2 \times 10^6$ | $3.6 \times 10^6$ | $4.6 \times 10^6$ | $4.2 \times 10^6$ | $4.9 \times 10^6$ |
| | Storage elastic modulus E' of rubbery plateau (Pa) | $3.8 \times 10^6$ | $3.3 \times 10^6$ | $3.2 \times 10^6$ | $3.8 \times 10^6$ | $4.7 \times 10^6$ |
| Evaluation of adhesiveness | | ○ | ○ | ○ | ○ | ○ |
| Adhesive residue | Reflectance (%) | 400 nm | 0.08 | 0.08 | 0.10 | 0.11 | 0.11 |
| | | 550 nm | 0.11 | 0.11 | 0.13 | 0.11 | 0.12 |
| | | 700 nm | 0.17 | 0.14 | 0.19 | 0.15 | 0.15 |
| | Average value of differences | 0.003 | 0.007 | 0.023 | −0.013 | −0.01 |
| | Evaluation | A | A | B | A | A |

TABLE 6

|  |  | Example 2-6 | Example 2-7 |
|---|---|---|---|
| Kind of microscopic roughness structure | | (2-2) | (2-3) |
| Mixing composition of adhesive composition (parts by mass) | EB8402 | 25 | 10 |
| | CHDMMA | 0 | 80 |
| | HPA | 75 | 0 |
| | AP400 | 0 | 10 |
| | IOA | 0 | 0 |
| | DAR TPO | 0.5 | 0.5 |
| Adhesive layer | 20% Compressive stress (MPa) | 0.82 | 0.65 |
| | Peak area ratio B1/B2 | 1.07 | 0.76 |
| | Storage elastic modulus Temperature (° C.) | 30 | 35 |
| | Storage elastic modulus E' (Pa) | $4.6 \times 10^6$ | $2.5 \times 10^6$ |
| | Storage elastic modulus E' of rubbery plateau (Pa) | $4.1 \times 10^6$ | $1.8 \times 10^6$ |
| Evaluation of adhesiveness | | ○ | ○ |
| Adhesive residue | Reflectance (%) 400 nm | 0.08 | 0.09 |
| | 550 nm | 0.08 | 0.13 |
| | 700 nm | 0.15 | 0.19 |
| | Average value of differences | −0.033 | 0.057 |
| | Evaluation | B | B |

TABLE 7

|  |  | Comparative Example 2-1 | Comparative Example 2-2 | Comparative Example 2-3 | Comparative Example 2-4 | Comparative Example 2-5 |
|---|---|---|---|---|---|---|
| Kind of microscopic roughness structure | | (2-1) | (2-1) | (2-1) | (2-1) | (2-2) |
| Mixing composition of adhesive composition (parts by mass) | EB8402 | — | — | 50 | 10 | 50 |
| | CHDMMA | — | — | 50 | 0 | 50 |
| | HPA | — | — | 0 | 80 | 0 |
| | AP400 | — | — | 0 | 0 | 0 |
| | IOA | — | — | 0 | 10 | 0 |
| | DAR TPO | — | — | 0.5 | 0.5 | 0.5 |
| Adhesive layer | 20% Compressive stress (MPa) | Not measurable | Not measurable | 3.1 | 0.41 | 3.1 |
| | Peak area ratio B1/B2 | 0.07 | 0.07 | 0.5 | 1.34 | 0.5 |
| | Storage elastic modulus Temperature (° C.) | Not measurable | Not measurable | 60 | Not measurable | 60 |
| | E' (Pa) | | | $10.5 \times 10^6$ | | $10.5 \times 10^6$ |
| | Storage elastic modulus E' of rubbery plateau (Pa) | | | $10.4 \times 10^6$ | | $10.4 \times 10^6$ |
| Evaluation of adhesiveness | | X | X | X | ○ | X |
| Adhesive residue | Reflectance (%) 400 nm | Not evaluated | Not evaluated | Not evaluated | 0.15 | Not evaluated |
| | 550 nm | | | | 0.13 | |
| | 700 nm | | | | 0.26 | |
| | Average value of differences | | | | 0.063 | |
| | Evaluation | | | | C | |

TABLE 8

|  |  | Comparative Example 2-6 | Comparative Example 2-7 | Comparative Example 2-8 | Comparative Example 2-9 | Comparative Example 2-10 |
|---|---|---|---|---|---|---|
| Kind of microscopic roughness structure | | (2-2) | (2-3) | (2-3) | (2-4) | (2-4) |
| Mixing composition of adhesive composition (parts by mass) | EB8402 | 10 | 50 | 10 | 30 | 10 |
| | CHDMMA | 0 | 50 | 0 | 0 | 0 |
| | HPA | 80 | 0 | 80 | 50 | 80 |
| | AP400 | 0 | 0 | 0 | 0 | 0 |
| | IOA | 10 | 0 | 10 | 20 | 10 |
| | DAR TPO | 0.5 | 0.5 | 0.5 | 0.5 | 0.5 |
| Adhesive layer | 20% Compressive stress (MPa) | 0.41 | 3.1 | 0.41 | 2.55 | 0.41 |
| | Peak area ratio B1/B2 | 1.34 | 0.5 | 1.34 | 0.7 | 1.34 |
| | Storage elastic modulus Temperature (° C.) | Not measurable | 60 | Not measurable | 25 | Not measurable |
| | E' (Pa) | | $10.5 \times 10^6$ | | $4.2 \times 10^6$ | |
| | Storage elastic modulus E' of rubbery plateau (Pa) | | $10.4 \times 10^6$ | | $3.8 \times 10^6$ | |
| Evaluation of adhesiveness | | ○ | X | ○ | X | X |
| Adhesive residue | Reflectance (%) 400 nm | 0.23 | Not evaluated | 0.26 | Not evaluated | Not evaluated |
| | 550 nm | 0.17 | | 0.07 | | |
| | 700 nm | 0.30 | | 0.31 | | |
| | Average value of differences | 0.097 | | 0.133 | | |
| | Evaluation | C | | C | | |

Abbreviations in Tables 2 to 8 are as follows.

EB8402: Bifunctional urethane acrylate (manufactured by Daicel-Cytec Co., Ltd., EBECRYL 8402)

CHDMMA: Cyclohexanedimethanol monoacrylate (manufactured by Nippon Kasei Chemical Co., Ltd.)

HPA: 2-Hydroxypropyl acrylate

AP400: Polypropylene glycol monoacrylate (manufactured by NOF Corp., BLENMER AP-400)

IOA: Isooctyl acrylate

DAR TPO: 2,4,6-Trimethylbenzoyl diphenylphosphine oxide (manufactured by Ciba Geigy Japan, Ltd DAROCURE TPO)

As it is obvious from the results shown in Tables 2 to 4, the protective film-attached microscopic roughness structures of various Examples were such that the protective films adhered satisfactorily to the microscopic roughness structures. Furthermore, even after two weeks passed, the protective films could be detached without having the adhesive residue.

Particularly, the adhesive layer included in the protective films used in Examples 1-1 to 1-3 and 1-5 were such that the storage elastic modulus E' at least any one temperature in the range of 10° C. to 60° C. was in the range of $1 \times 10^6$ Pa to $6 \times 10^6$ Pa. Among them, in the case of Examples 1-1 and 1-2, the storage elastic modulus E' at 25° C. was in the range of $1 \times 10^6$ Pa to $6 \times 10^6$ Pa, and there was no problem with attachment at room temperature (25° C.). In addition, the adhesive layer included in the protective film used in Example 1-3 was such that the storage elastic modulus E' at 25° C. exhibited a value larger than $6 \times 10^6$ Pa, but the storage elastic modulus E' at 35° C. reached $2.5 \times 10^6$ Pa. Furthermore, the adhesive layer included in the protective film used in Example 1-5 was such that the storage elastic modulus E' at 25° C. exhibited a value larger than $6 \times 10^6$ pa, but the storage elastic modulus E' at 45° C. reached $4.6 \times 10^6$ Pa. From these results, it was found that the protective films used in Examples 1-3 and 1-5 were not easily attachable at room temperature (25° C.) as compared with the protective films used in Examples 1-1 and 1-2; however, when the protective film was affixed to the surface of the microscopic roughness structure while having the storage elastic modulus E' adjusted to $6 \times 10^6$ Pa or less, that is, when the adhesive layer of the protective film is heated to, for example, 35° C. or 45° C. immediately before the protective film is attached to the microscopic roughness structure, the protective film can be easily attached.

Furthermore, the adhesive layers included in the protective films used in Examples 1-1, 1-2, 1-4 and 1-5 were such that the storage elastic modulus E' had a rubbery plateau of $2 \times 10^6$ Pa or greater, and had properties that did not easily change even in a long-term storage or in a high humidity and high temperature environment.

On the other hand, in the protective film-attached microscopic roughness structures of Comparative Examples 1-1 to 1-3, 1-5 and 1-6 that used protective films including adhesive layers which exhibited a compressive stress of less than 0.6 MPa when the adhesive layer was compressed to a compression ratio of 20%, because the adhesive layers were too soft, when the protective films were detached after the passage of two weeks, adhesive residue occurred. Particularly in the case of Comparative Examples 1-5 and 1-6, adhesive residue occurred to the extent that the wavelength-dependency of the reflectance was changed.

In the case of Comparative Example 1-4, because the adhesive layer was too soft, the adhesive layer penetrated too deeply into the concavities of the microscopically rough structure, and the protective film could not be detached from the stage immediately after attachment. Furthermore, a specimen for the evaluation of the compressive stress and the storage elastic modulus E' of the adhesive layer could not be collected.

In the protective film-attached microscopic roughness structure of Comparative Example 1-7 that used a protective film including an adhesive layer which exhibited a compressive stress of 3.1 MPa when the adhesive layer was compressed to a compression ratio of 20%, since the adhesive layer was too hard, it was difficult for the adhesive layer to penetrate into the concavities of the microscopically rough structure, and adhesiveness was inferior. Therefore, the reflectance was not measured.

Furthermore, as it is obvious from the results shown in Tables 5 to 8, the protective film-attached microscopic roughness structures of various Examples were such that the protective films adhered satisfactorily to the microscopic roughness structures. Furthermore, the protective films could be detached even after the passage of two weeks, without having adhesive residue.

Furthermore, the adhesive layers included in the protective films used in the Examples had a storage elastic modulus E' in the rubbery plateau of $1.5 \times 10^6$ Pa or greater, and had properties that did not easily change even in long-term storage or in a high humidity and high temperature environment.

On the other hand, in Comparative Examples 2-1 to 2-3, 2-5 and 2-7 that used protective films in which the ratio B1/B2 of the surface of the adhesive layer was less than 0.6, there were few functional groups that were capable of forming hydrogen bonding at the surface of the adhesive layer, adhesiveness was poor, and a protective film-attached microscopic roughness structure could not be obtained.

Furthermore, in Comparative Examples 2-4, 2-6 and 2-8 that used protective films in which the ratio B1/B2 of the surface of the adhesive layer was more than 1.3, the interaction between the protective film and the surface of the microscopic roughness structure was strong, and when the protective film was detached after the passage of two weeks, adhesive residue was generated.

Furthermore, in Comparative Examples 2-9 and 2-10, since the ratio A1/A2 of the surface on the microscopically rough structure side of the microscopic rough structures was less than 0.1, and there were few functional groups that were capable of hydrogen bonding, there was no sufficient interaction between the microscopic roughness structure and the adhesive layer of the protective film, adhesiveness was poor, and a protective film-attached microscopic roughness structure could not be obtained.

INDUSTRIAL APPLICABILITY

The protective film-attached microscopic roughness structure of the present invention can prevent damaging of the microscopically rough structure during transport and processing, while maintaining the excellent optical performance required in a microscopic roughness structure. In addition, the protective film-attached microscopic roughness structure can exhibit the initial optical performance even in long-term storage, without causing adhesive residue. Therefore, the microscopic roughness structure obtained by detaching the protective film from the protective film-attached microscopic roughness structure of the present invention can be used in, for example, construction material applications (walls, roofs and the like), window materials (houses, automobiles, trains, ships and the like), mirrors and the like, and is industrially very useful. Furthermore, the microscopic roughness structure can also be used in applications such as displays where antireflective performance is required.

EXPLANATIONS OF LETTERS OR NUMERALS

1 PROTECTIVE FILM-ATTACHED MICROSCOPIC ROUGHNESS STRUCTURE
10 MICROSCOPIC ROUGHNESS STRUCTURE
11 BASE MATERIAL
12 CURED PRODUCT
13 CONVEXITY
13a APEX
13b APEX
14 CONCAVITY
14a BOTTOM
15 INTERMEDIATE LAYER
20 PROTECTIVE FILM
21 ADHESIVE LAYER
22 FILM BASE MATERIAL
30 ALUMINUM PLATE
31 PORE
32 OXIDE FILM
33 DEPRESSION
34 OXIDE FILM
35 PORE
40 MOLD

The invention claimed is:

1. A protective film-attached microscopic roughness structure comprising:
a microscopic roughness structure on the surface having a microscopically rough structure having a period less than or equal to the wavelength of visible light, and
a protective film for protecting the surface of the microscopic roughness structure affixed thereto,
wherein the water contact angle of the surface of the microscopic roughness structure is 40° or less, the protective film comprises an adhesive layer that is in contact with the surface on the microscopically rough structure side, and the compressive stress obtainable when the adhesive layer is compressed in the thickness direction to a compression ratio of 20% is 0.6 MPa to 3.0 MPa,
wherein the adhesive layer of the protective film is affixed to the entire surface of the microscopic roughness structure without extending beyond the surface of the microscopic roughness structure.

2. A protective film-attached microscopic roughness structure comprising:
a microscopic roughness structure on the surface having a microscopically rough structure having a period less than or equal to the wavelength of visible light, and
a protective film for protecting the surface of the microscopic roughness structure affixed thereto,
wherein the protective film comprises an adhesive layer that is in contact with the surface on the microscopically rough structure side; in the infrared absorption spectrum of the surface of the microscopically rough structure, the ratio (A1/A2) of the peak area A1 having the absorption maximum in the region of 3700 cm$^{-1}$ to 3100 cm$^{-1}$, and the peak area A2 having the absorption maximum in the region of 1730±10 cm$^{-1}$, is 0.1 to 0.8; and in the infrared absorption spectrum of the surface of the adhesive layer, the ratio (B1/B2) of the peak area B1 having the absorption maximum in the region of 3700 cm$^{-1}$ to 3100 cm$^{-1}$, and the peak area B2 having the absorption maximum in the region of 1730±10 cm$^{-1}$, is 0.6 to 1.3,
wherein the adhesive layer of the protective film is affixed to the entire surface of the microscopic roughness structure extending beyond the surface of the microscopic roughness structure.

3. The protective film-attached microscopic roughness structure according to claim 1, wherein in the infrared absorption spectrum of the surface of the adhesive layer, the ratio (B1/B2) of the peak area B1 having the absorption maximum in the region of 3700 cm$^{-1}$ to 3100 cm$^{-1}$, and the peak area B2 having the absorption maximum in the region of 1730±10 cm$^{-1}$, is 0.6 to 1.3.

4. The protective film-attached microscopic roughness structure according to claim 1, wherein in the infrared absorption spectrum of the surface of the microscopically rough structure, the ratio (A1/A2) of the peak area A1 having the absorption maximum in the region of 3700 cm$^{-1}$ to 3100 cm$^{-1}$, and the peak area A2 having the absorption maximum in the region of 1730±10 cm$^{-1}$, is 0.1 to 0.8.

5. The protective film-attached microscopic roughness structure according to claim 1, wherein the storage elastic modulus E of the adhesive layer is in the range of $1\times10^6$ Pa to $6\times10^6$ Pa at least any one temperature in the range of 10° C. to 60° C.

6. The protective film-attached microscopic roughness structure according to claim 2, wherein in the adhesive layer, the storage elastic modulus E has a rubbery plateau in the range of $1.5\times10^6$ Pa or greater.

7. A method for producing the protective film-attached microscopic roughness structure according to claim 1, the method comprising heating the adhesive layer, and affixing the protective film to the surface of the microscopic roughness structure.

8. The method for producing the protective film-attached microscopic roughness structure according to claim 7, wherein the protective film is affixed to the surface of the microscopic roughness structure while the storage elastic modulus E of the adhesive layer is adjusted to $6\times10^6$ Pa or less.

9. The protective film-attached microscopic roughness structure according to claim 5, wherein in the adhesive layer, the storage elastic modulus E has a rubbery plateau in the range of $1.5\times10^6$ Pa or greater.

10. A method for producing the protective film-attached microscopic roughness structure according to claim 2, the method comprising heating the adhesive layer, and affixing the protective film to the surface of the microscopic roughness structure.

11. The method for producing the protective film-attached microscopic roughness structure according to claim 10, wherein the protective film is affixed to the surface of the microscopic roughness structure while the storage elastic modulus E of the adhesive layer is adjusted to $6\times10^6$ Pa or less.

12. The protective film-attached microscopic roughness structure according to claim 1, wherein the adhesive layer comprises any one of the compounds selected from the group consisting of cyclohexanedimethanol monoacrylate, 2-hydroxypropyl acrylate, and polypropylene glycol monoacrylate.

13. The protective film-attached microscopic roughness structure according to claim 2, wherein the adhesive layer comprises any one of the compounds selected from the group consisting of cyclohexanedimethanol monoacrylate, 2-hydroxypropyl acrylate, and polypropylene glycol monoacrylate.

* * * * *